US010952074B2

(12) United States Patent
Verma et al.

(10) Patent No.: US 10,952,074 B2
(45) Date of Patent: *Mar. 16, 2021

(54) METHOD AND APPARATUS FOR AUTHENTICATING USERS IN INTERNET OF THINGS ENVIRONMENT

(71) Applicant: Samsung Electronics Co., Ltd., Suwon-si (KR)

(72) Inventors: Pratik Verma, Bangalore (IN); Aloknath De, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/439,285

(22) Filed: Jun. 12, 2019

(65) Prior Publication Data
US 2019/0297498 A1    Sep. 26, 2019

Related U.S. Application Data

(63) Continuation of application No. 15/902,624, filed on Feb. 22, 2018, now Pat. No. 10,334,439.

(30) Foreign Application Priority Data

Feb. 22, 2017   (IN) .............................. 201741006329
Jan. 9, 2018    (IN) ............................. 2017 41006329

(51) Int. Cl.
*H04W 12/06* (2009.01)
*H04W 12/08* (2021.01)
(Continued)

(52) U.S. Cl.
CPC ............ *H04W 12/06* (2013.01); *G06F 21/31* (2013.01); *G06F 21/316* (2013.01); *G06F 21/32* (2013.01);
(Continued)

(58) Field of Classification Search
CPC ........ G06F 21/31; G06F 21/44; G06F 21/445; G06F 21/45; G06F 21/316;
(Continued)

(56) References Cited

U.S. PATENT DOCUMENTS 9,294,476 B1      3/2016 Lurey et al.
2006/0036868 A1*  2/2006 Cicchitto .............. G06F 21/305
                                                    713/182
(Continued)

FOREIGN PATENT DOCUMENTS

JP    2016099684 A    5/2016
WO    2016138067 A1   9/2016

OTHER PUBLICATIONS

European Search Report dated Nov. 6, 2019, issued in European Patent Application No. 18758483.4.

*Primary Examiner* — Quoc Thai N Vu
(74) *Attorney, Agent, or Firm* — Jefferson IP Law, LLP

(57) ABSTRACT

The present disclosure relates to a sensor network, machine type communication (MTC), machine-to-machine (M2M) communication, and technology for Internet of things (IoT). The present disclosure may be applied to intelligent services based on the above technologies, such as smart home, smart building, smart city, smart car, connected car, health care, digital education, smart retail, security and safety services. A method and an authenticating system for authenticating users in an IoT environment are provided. The method includes receiving an access request to at least one device present in the IoT environment, identifying a type of questions based on at least one of a user interface (UI) type of the at least one device, or an authentication level of the at least one device, generating at least one question corresponding to the type of questions based on at least one of user data of a user associated with the access request, or device data of one or more devices associated with the user, presenting the
(Continued)

at least one question to at least one of the user and the one or more devices, and authenticating the user to access the at least one device based on a response for the at least one question received from the at least one of the user and the one or more devices.

20 Claims, 20 Drawing Sheets

(51) Int. Cl.
    *G06F 21/31*     (2013.01)
    *G06F 21/32*     (2013.01)
    *H04L 29/06*     (2006.01)
    *H04W 4/70*     (2018.01)
    *H04L 29/08*     (2006.01)

(52) U.S. Cl.
    CPC .......... *H04L 63/083* (2013.01); *H04L 63/102* (2013.01); *H04W 12/08* (2013.01); *G06F 2221/2103* (2013.01); *H04L 67/12* (2013.01); *H04W 4/70* (2018.02)

(58) Field of Classification Search
    CPC ............ G06F 2221/2103; G06F 21/32; H04W 12/06; H04W 12/08; H04W 4/70; H04L 63/08; H04L 67/12; H04L 67/36; H04L 9/32; H04L 63/083; H04L 63/102
    See application file for complete search history.

(56) References Cited

U.S. PATENT DOCUMENTS

| | | |
|---|---|---|
| 2012/0214442 A1 | 8/2012 | Crawford et al. |
| 2012/0216260 A1 | 8/2012 | Crawford et al. |
| 2015/0007273 A1 | 1/2015 | Lin |
| 2015/0156183 A1 | 6/2015 | Beyer et al. |
| 2015/0188898 A1 | 7/2015 | Chow et al. |
| 2016/0203234 A1 | 7/2016 | Piccand et al. |
| 2016/0205106 A1 | 7/2016 | Yacoub et al. |
| 2016/0315929 A1* | 10/2016 | Childress .............. H04W 12/06 |
| 2017/0250974 A1 | 8/2017 | Antonyraj et al. |
| 2018/0042061 A1* | 2/2018 | Iinuma .................. H04W 76/14 |
| 2018/0115554 A1* | 4/2018 | Dyon .................... H04L 63/102 |

* cited by examiner

| User questions (Explicit) | Device data-Foot Prints | Device-Questions (Implicit) | User-Activity via device |
|---|---|---|---|

Question 1

| When did you went to korea? | Jul 16 | Wi-Fi router to phone? <Software version JUL 16>? | 2.4.01 | Wi-Fi router to phone? <Jun 16 GPS coordinates> <Location tag from photos> <Time of Korean messages> | <70,70,.> <Korea> <10:1 0:20> |
|---|---|---|---|---|---|

Derived from photos or location log
P(Authentic User) = 0.55

Inferred based on data consumption

P(Authentic User | Devices) = 0.65

Question 2

| In which bank you have Account? | BOA | Wi-Fi router to phone? <Web access to web BOA> | <1,1, 16> | Wi-Fi router to phone? <Time of connection to BOA> <Session times> <No message from BOA> | <12:12,.> <.55> <10> |
|---|---|---|---|---|---|

Derived from Phone Messages or email
P(Authentic User) = 0.75

Inferred based on cloud connection

P(Authentic User | Devices) = 0.85

Question 3

| Which item you purchased last month from amazon? | book | Smart hub to Gear? <Voice order placed to On 2016.12.13.9:0:0 size> | 29.36 KB | Smart hub to Gear? <Access to amaozon.in> <Workout activity log> <Data&time of workout> | <12:10> <23.55> <10:12:1> |
|---|---|---|---|---|---|

Inferred from Samsung Pay history
P(Authentic User) = 0.80

Voice order placed via gear

P(Authentic User | Devices) = 0.80

Question 4

| GYM exercise or activity you did on Monday? | Running | Refrigerator to smart-Belt? <last data upload> <size of data captured Sunday> | 239 | Refrigerator to smart-shoes? <Vest size sensed> <No of steps takes> | <34,.> <655> <10:12:1> |
|---|---|---|---|---|---|

Inferred from gear Cloud
P(Authentic User) = 0.90

Smart refrigerator

P(Authentic User | Devices) = 0.95

FIG.19

METHOD AND APPARATUS FOR AUTHENTICATING USERS IN INTERNET OF THINGS ENVIRONMENT

CROSS-REFERENCE TO RELATED APPLICATION(S)

This application is a continuation application of prior application Ser. No. 15/902,624, filed on Feb. 22, 2018, which was based on and claimed under 35 U.S.C. § 119(a) of an Indian patent application number 201741006329, filed on Feb. 22, 2017, in the Indian Intellectual Property Office, and of an Indian patent application number 201741006329, filed on Jan. 9, 2018, in the Indian Intellectual Property Office, the disclosure of each of which is incorporated by reference herein in its entirety.

TECHNICAL FIELD

The disclosure relates to the field of Internet of things (IoT). More particularly, the disclosure relates to authenticating users in the IoT environment.

BACKGROUND

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In various interdependent domains of IoT, such as a smart-home, a connected-car, a smart-health, and the like, user authentication is a challenge. There is no intuitive and foolproof method to validate the user in an easy manner.

Currently, each IoT device/application has its own pin and/or password to authenticate the user. Considering large number of IoT devices/applications present today, it's very difficult for the user to remember huge number of pins/passwords for gaining access to individual applications/devices. In addition, currently, there is no fool proof solution in biometric authentications to deal with the challenges of liveness detection, fake identity detection, injured finger for prints, and the like.

In a multi-user environment, typically scenarios are tied with domains like smart-home, smart city, connected car and devices are bound to be used by multiple users. Hence, there is no standard procedure to provide multi-level access to multiple users using intuitive authentication.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for authenticating users in an Internet of things (IoT) environment, wherein a method includes receiving a user requests access to at least one device present in the IoT environment, generating at least one question in response to the user access request, presenting the at least one question to at least one of the user and the corresponding at least one device present in the IoT environment for a response and generating a score based on the response received from the at least one of the user and the corresponding at least one device present in the IoT environment, authenticating the user to the at least one device based on the generated score, and providing a level of access to the user based on the generated score.

In accordance with an aspect of the disclosure, a method and a system for authenticating users in an IoT environment is provided. The method includes receiving a user access request to at least one device present in the IoT environment. Further, the method includes generating at least one question in response to the user access request, wherein the at least one question is generated based on at least one of a user data and the at least one device data. Further, the method includes presenting the at least one question to at least one of the users and the corresponding at least one device present in the IoT environment for a response. Further, the method includes generating a score based on the response received from the at least one of the users and the corresponding at least one device present in the IoT environment. Further, the method includes authenticating the user to access the at least one device based on the generated score.

In accordance with another aspect of the disclosure, an authenticating device for authenticating users in an IoT environment is provided. The authenticating device includes an input receiving unit configured to receive a user access request to at least one device present in the IoT environment. Further, the authenticating device includes a question generating unit configured to generate at least one question in response to the user access request, wherein the at least one question is generated based on at least one of a user data and the at least one device data. Further, the authenticating device includes a question presenting unit configured to present the at least one question to at least one of the users and the corresponding at least one device present in the IoT environment for a response. Further, the authenticating device includes an authenticating unit configured to generate a score based on the response received from the at least one of the users and the corresponding at least one device present in the IoT environment. Further, the authenticating unit configured to authenticate the user to access the at least one device based on the generated score.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 19 illustrates authenticating a user by generating user questions and device(s) questions according to an embodiment of the disclosure.

Throughout the drawings, like reference numerals will be understood to refer to like parts, components, and structures.

DETAILED DESCRIPTION

Figure 1:
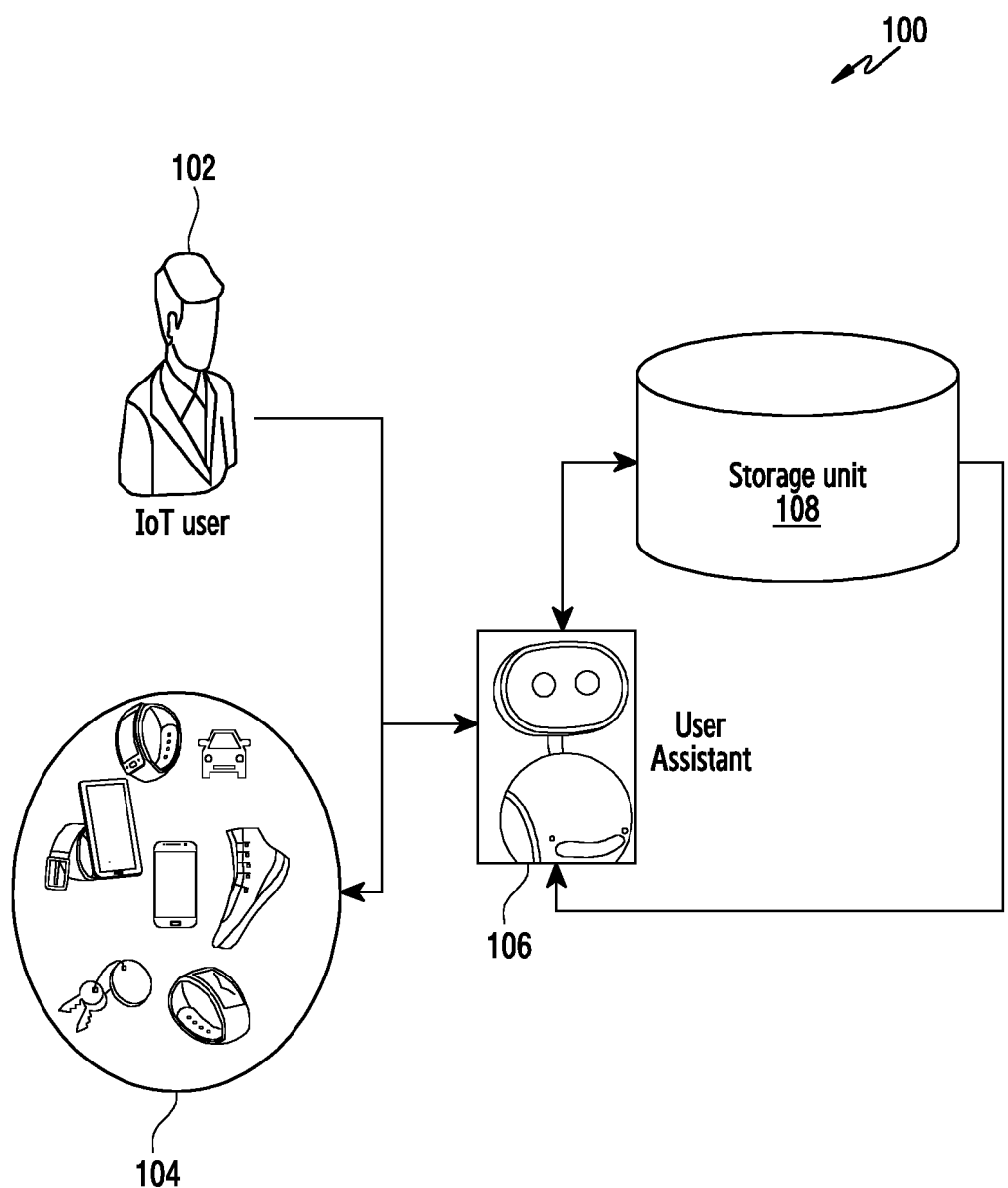
FIG. 1 illustrates an overview of an authenticating system for performing a seamless authentication of a user in an Internet of things (IoT) environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The embodiments herein disclose methods and systems for seamless authentication of a user in an Internet of things (IoT) environment. A method disclosed herein includes determining the user access request to one or more devices present in the IoT environment, wherein the one or more devices are associated with at least one user in the IoT environment. Further, the method includes generating one or more questions to at least one of the users and the one or more devices present in the IoT environment. The one or more questions can be generated based on at least one of users and the one or more devices interaction information, the one or more devices to device interaction information, user's past activity information, and device activity information. Further, the method includes presenting the one or more questions to at least one of the users and the corresponding one or more devices present in the IoT environment for a response. Further, the method includes generating a score based on the response received from the at least one of the users and the corresponding at least one device present in the IoT environment. Further, the method includes authenticating the user and providing a level of access to the user based on the generated score.

The one or more questions generated can be multi-dimensional questionnaires. The one or more questions can be generated for the user and the one or more devices possessed by the user in the IOT environment. At a broad scale, the user would be asked fewer questions without leaking any sensitive or private information to establish a primary confidence. In an embodiment of the disclosure, there can be no question to the user(s), if the user is authenticated by a physical means (for example, biometric authentication). Later the corresponding one or more devices [related to user's response], possessed by the user in the IOT environment will be asked/queried a sequence of question(s) through an application programming interface (API) to get a precise response to establish the user's identity. This questionnaire may gain confidence through the one or more devices response at a higher granularity. In addition, procedure and scope to choose near or related devices can be developed, so that an IOT device/authenticating device can ask questions to another-related IOT device associated with the same user in the IoT environment. Various intelligent questions can be developed by using the one or more of devices footprints, application footprints, application logs, device to device activity log, device logs, user logs and past user data. Seamless querying can be responded by connecting the one or more devices to corresponding storage unit 108 (for example, public or private clouds) for the validation based on historic data. In this scenario, once the user's identity is established, seamless accessibility to the one or more devices, functionality, system could be given to the user just by validating the one or more devices carried by the user. Generating of questions and device selection can also be based on intelligence drawn based on the user's activity.

Referring now to the drawings, and more particularly to FIGS. 1 through 19, where similar reference characters denote corresponding features consistently throughout the figures, there are shown example embodiments.

FIG. 1 illustrates an overview of an authenticating system for performing a seamless authentication of a user in an IoT environment according to an embodiment of the disclosure.

Referring to FIG. 1, an authenticating system 100 includes at least one device(s) 104, a user assistant 106 and a storage unit 108 to authenticate a user 102. Initially, device(s) 104 present in the IoT environment can be configured to receive the user access request. The user access request can comprise a user input to the device(s) 104 to get access to the device(s) 104 present in the IoT environment. The user input can comprise at least one of, but is not limited to, a text, a phrase, a biometric input, voice, touch, a tap, double tap, drag, flip or the like. Based on the user access request, the device(s) 104 can be triggered to generate question(s), wherein the question(s) can comprise of at least one multi-dimensional questionnaire for the user 102 and the device(s) 104 present in the IoT environment. For example, the device(s) 104 can be, but is not limited to, a mobile phone, a smartphone, tablet, a phablet, a personal digital assistant (PDA), a laptop, a computer, a wearable computing device, a vehicle infotainment system, or the like, possessed by the user 102 in the IOT environment. The embodiments herein enable at least one of the device(s) 104, an IoT hub, and a user assistant 106 (for example, home assistant, voice assistant, interactive device, robot, bot or the like) to facilitate the question(s) to the user 102 and the device(s) 104 present in the IoT environment by interacting with the storage unit 108. The storage unit 108 comprising at least one of a file server, a data server, a server, a cloud or the like.

The question(s) can be generated based on at least one of a user data and the device(s) 104 data. The user data includes, but is not limited to, user activity information (past and future activity information), inferred activities (running, sleeping or the like), commitments (for example, emails calendar events or the like), explicit activities (for example, application and device usage), user personal data, group user activity information, user log information, user biological traits (for example, weight, height, biometrics or the like) or the like. The device(s) 104 data includes, but is not limited to, device(s) 104 activities (for example, device activity logs, time of connectivity, data downloaded or uploaded, application updates, logs uploaded, global positioning system (GPS) coordinates, websites, media tags, language, storage unit 108 settings (for example, cloud settings), software version number or the like) device(s) footprints, application(s) footprints, application(s) logs or the like. In an embodiment of the disclosure, the user data and the device(s) 104 data can be stored in at least one of the device(s) 104 and in the storage unit 108. In an embodiment of the disclosure, if the user accessed device(s) 104 is a constrained device (i.e., devices without user interface (UI)), then the device(s) 104 can be configured to request at least one of the IoT hub and the user assistant 106 to facilitate authenticating the user by presenting the question(s) to the user 102 and the device(s) 104. In an embodiment of the disclosure, if the user accessed device(s) 104 is an unconstrained device(s) (i.e., devices with at least one UI), then the device(s) 104 can be configured to facilitate authenticating the user by presenting the question(s) to the user 102 and the device(s) 104. Further, the device 104 can present the generated question(s) to at least one of the users 102 and the corresponding device(s) present in the IoT environment for a response. In an embodiment of the disclosure, if the device(s) is a constrained device, then the questions can be presented to the user 102 through at least one of IoT hub and user assistant. In an embodiment of the disclosure, if the device(s) is an unconstrained device, then the questions can be presented to the user through the device(s) 104 (for example, through voice, text, web or the like). Based on the user response to the generated question(s), a score can be generated. Further, the question(s) can be presented to the corresponding device(s) in the IoT environment, wherein the question are presented through the API of the device 104. Further, based on the corresponding device(s) response to the questions, a score can be generated. Further, based on the score generated for the response from the user 102 and the score generated for the response from the corresponding device(s) 104, a probability score can be generated. If the probability score is more than a pre-defined threshold score, then the user can be authenticated to access the device(s) 104. The predefined threshold can be defined as per criticality of use cases, like higher for Locker, lower for TV channel. In an embodiment of the disclosure, based on the generated scores, the device(s) 104 can be configured to provide a level of access to the user 102.

Figure 2:
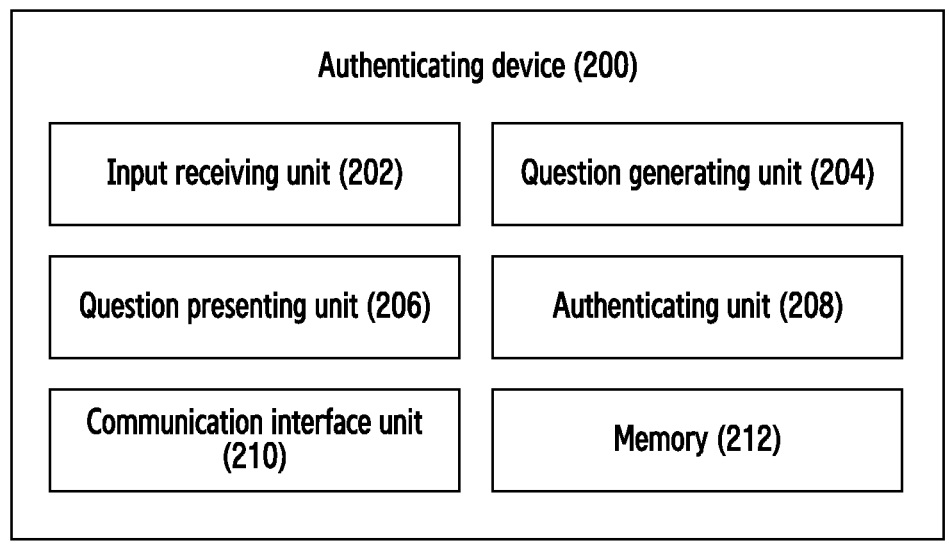
FIG. 2 is a block diagram illustrating units of an authenticating device for authenticating a user in an IoT environment according to an embodiment of the disclosure.

FIG. 2 illustrates a block diagram illustrating units of an authenticating device for authenticating a user in an IoT environment according to an embodiment of the disclosure.

Referring to FIG. 2, the authenticating device 200 can be configured to authenticate the user 102, when the user 102 is trying to access the device(s) 104 present in the IoT environment. In an embodiment of the disclosure, the authenticating device 200 may be a kind of an electronic device, which may comprise at least one of the device(s) 104, the user assistant 106, or the storage unit 108 as illustrated in FIG. 1. In an embodiment of the disclosure, the device(s) 104 can be at least one of, but not restricted to, a mobile phone, a smartphone, tablet, a phablet, a PDA, a laptop, a computer, a wearable computing device, a vehicle infotainment system, or the like, possessed by the user 102 in the IoT environment. The authenticating device 200 includes at least one input receiving unit 202, a question generating unit 204, a question presenting unit 206, an authenticating unit 208, a communication interface unit 210, and a memory 212.

The input receiving unit 202 can be configured to receive the user 102 requests access to the device(s) 104 present in the IoT environment. The user access request can be a user input to the device(s) 104 to get access to the device(s) 104 present in the IoT environment. The user input can comprise at least one of, but is not limited to, a text, a phrase, a biometric input a voice, touch, a tap, double tap, drag, flip or the like.

The question generating unit 204 can be configured to generate one or more questions in response to the user access request. The question(s) can be a set of multi-dimensional questionnaire(s) for the user 102 and the device(s) 104 present in the IoT environment. The one or more questions can be generated based on user data and the device(s) 104 data. The user data includes, but is not limited to, user activity information (past and future activity information), inferred activities (running, sleeping or the like), commitments (for example, emails calendar events or the like), explicit activities (for example, application and device usage), user personal data, group user activity information, user log information, user biological traits (for example, weight, height, biometrics or the like) or the like. The device(s) 104 data includes, but is not limited to, device(s) 104 activities (for example, device activity logs, time of connectivity, data downloaded or uploaded, application updates, logs uploaded, storage unit 108 settings (for example, cloud settings or the like), software version number or the like) device(s) footprints, application(s) footprints, application(s) logs or the like. In an embodiment of the disclosure, the user data and the device(s) 104 data can be stored in at least one of the device(s) 104 and in the storage unit 108. When the user access the device(s) present in the IoT environment, the device(s) interacts with the storage unit 108 and generates the question for the user 102 and the device(s) 104. In an embodiment of the disclosure, if the user accessed device(s) 104 is a constrained device(s), then the device(s) 104 can be configured to request at least one of the IoT hub and the user assistant 106 to facilitate authenticating the user by presenting the question(s) to the user 102 and the device(s) 104. In an embodiment of the disclosure, if the user 102 accessed device(s) 104 is an unconstrained device(s), then the device(s) 104 can be configured to facilitate authenticating the user by presenting the question(s) to the user 102 and the device(s) 104.

The question presenting unit 206 can be configured to present the one or more questions to at least one of the users and the corresponding device(s) present in the IoT environment for a response. In an embodiment of the disclosure, if the device(s) is a constrained device, then the questions can be presented to the user 102 through at least one of the IoT hub and the user assistant. In an embodiment of the disclosure, if the device(s) 104 is an unconstrained device, then the questions can be presented to the user through the device(s) 104 itself. In an embodiment of the disclosure, the one or more questions can be presented to the user 102 and the corresponding device(s) 104 through at least one of voice, text, web and the API or the like.

The authenticating unit 208 can be configured to generate a score based on the response received from the at least one of the users and the corresponding one or more device(s) 104 present in the IoT environment. Further, the authenticating unit 208 can be configured to authenticate the user to access the one or more device(s) 104 based on the generated score. Based on the generated score, the authenticating unit 208 can determine the level of access to be provided to the user.

The communication interface unit 210 can be configured to establish communication with external entities, such as the device(s) 104 present in the IoT environment, the storage unit 108, and the like.

A memory 212 can be configured to store the user data and the device data. The memory 212 may include one or more computer-readable storage media. The memory 212 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 212 may, in some examples, be considered a non-transitory storage medium. The term "non-transitory" may indicate that the storage medium is not embodied in a carrier wave or a propagated signal. However, the term "non-transitory" should not be interpreted to mean that the memory 212 is non-movable. In some examples, the memory 212 can be configured to store larger amounts of information than the memory. In certain examples, a non-transitory storage medium may store data that can, over time, change (for example, in random access memory (RAM) or cache).

Although not shown, according to various embodiments of the disclosure, the authenticating device 200 may further comprise at least one of a transceiver, or at least one processor. The transceiver may comprise at least one of the input receiving unit 202, or the communication interface unit 210. Accordingly, the transceiver may perform functions of at least one of the input receiving unit 202, or the communication interface unit 210. The at least one processor controls the general operation of the authenticating device 200. For example, the at least one processor transmits and receives a signal through the transceiver. Further, the at least one processor records data in the memory 212 and reads the recorded data. The at least one processor may perform functions of a protocol stack that is required from a communication standard. According to another implementation, the protocol stack may be included in the transceiver. To this end, the at least one processor may include microprocessor, or may play the part of the processor. Further, the part of the transceiver or the at least one processor may be referred to as a communication processor (CP). According to various embodiments of the disclosure, the at least one processor may include at least one of the question generating unit 204, the question presenting unit 206, or the authenticating unit 208. Here, the question generating unit 204, the question presenting unit 206, or the authenticating unit 208 may be a command/code temporarily resided in the at least one processor, a storage space that stores the command/code, or a part of circuitry of the at least one processor. According to various embodiments of the disclosure, the at least one processor may be further configured to control at least one of the question generating unit 204, the question presenting unit 206, or the authenticating unit 208. That is, the at least one processor may control functions of at least one of the question generating unit 204, the question presenting unit 206, or the authenticating unit 208.

According to exemplary embodiments of the present disclosure, the at least one processor may control to receive an access request to at least one device present in the IoT environment, identify a type of questions based on at least one of a user interface (UI) type of the at least one device, or an authentication level of the at least one device, generate at least one question corresponding to the type of questions based on at least one of user data of a user associated with the access request, or device data of one or more devices associated with the user, present the at least one question to at least one of the user and the one or more devices, and authenticate the user to access the at least one device based on a response for the at least one question received from the at least one of the user and the one or more devices. For example, the at least one processor may control the authenticating device 200 to perform operations according to the exemplary embodiments of the present disclosure.

FIG. 2 illustrates units of the authenticating device 200, but it is to be understood that other embodiments are not limited thereon. In other embodiments of the disclosure, the authenticating device 200 may include less or more number of units. Further, the labels or names of the units are used only for illustrative purpose and does not limit the scope of the embodiments herein. One or more units can be combined together to perform same or substantially similar function in the authenticating device 200.

Figure 3:
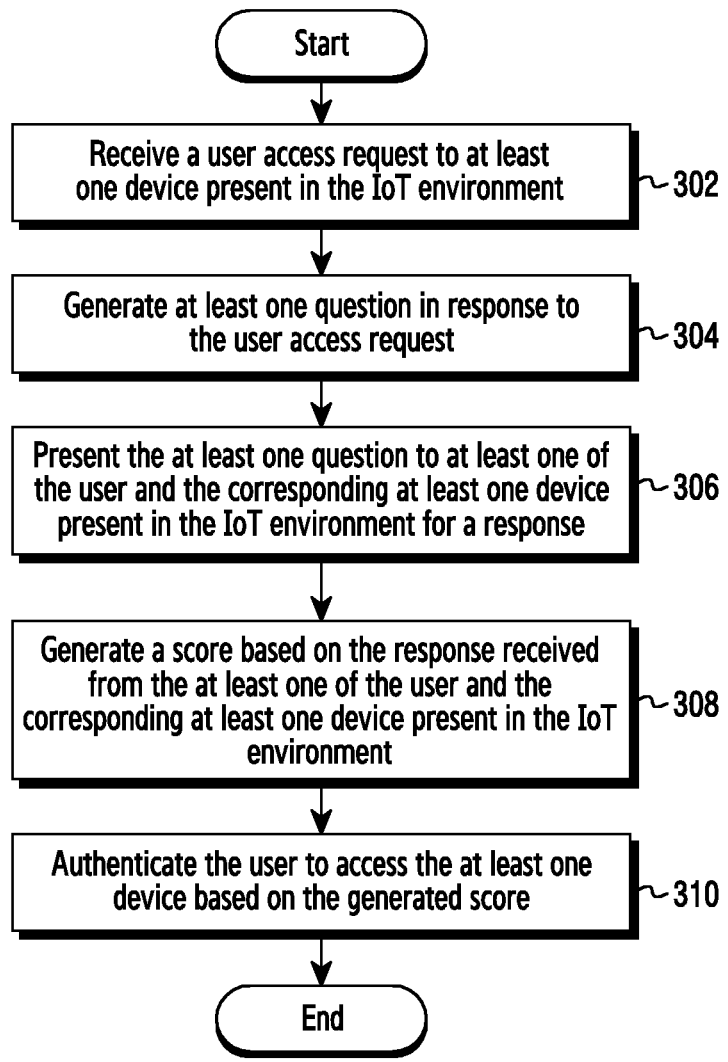
FIG. 3 is a flow diagram illustrating a method for authenticating a user in an IoT environment according to an embodiment of the disclosure.

FIG. 3 illustrates a flow diagram illustrating a method for authenticating a user in an IoT environment according to an embodiment of the disclosure.

Referring to FIG. 3, at operation 302, the method includes receiving the user 102 access requests to the device(s) 104 present in the IoT environment. The method allows the input receiving unit 202 to receive the user 102 access requests to one or more device(s) 104 present in the IoT environment. In an embodiment of the disclosure, the user access request can be a user input to the device(s) 104 to get access to the device(s) 104 present in the IoT environment. The user input can be at least one of, but is not limited to, a text, a phrase, a biometric input, voice, touch, a tap, double tap, drag, flip or the like.

At operation 304, the method includes generating one or more questions in response to the user 102 access request. The method allows the question generating unit 204 to generate one or more questions in response to the user 102 access request. The question(s) can be a set of multi-dimensional questionnaire(s) for the user 102 and the device(s) 104 present in the IoT environment. The one or more questions are generated based on user data and the device(s) 104 data. The user data includes, but is not limited to, user activity information (past and future activity information), inferred activities (running, sleeping or the like), commitments (for example, emails calendar events or the like), explicit activities (for example, application and device usage), user personal data, group user activity information, user log information, user biological traits (for example, weight, height, biometrics or the like) or the like. The device(s) 104 data includes, but is not limited to, device(s) 104 activities (for example, device activity logs, time of connectivity, data downloaded or uploaded, application updates, logs uploaded, storage unit 108 settings (for example, cloud settings), software version number or the like) device(s) footprints, application(s) footprints, application(s) logs or the like. In an embodiment of the disclosure, the data from the user and the device(s) 104 can be stored in at least one of the device(s) 104 and in the storage unit 108. When the user accesses the device(s) present in the IoT environment, the device(s) interacts with the storage unit 108 and generates the question for the user 102 and the device(s) 104.

At operation 306, the method includes presenting the one or more questions to at least one of the users 102 and the corresponding device(s) 104 present in the IoT environment for a response. The method allows the question presenting unit 206 to present the one or more questions to at least one of the users and the corresponding device(s) present in the IoT environment for a response. In an embodiment of the disclosure, if the device(s) is a constrained device, then the questions can be presented to the user 102 through at least one of the IoT hub and the user assistant. In an embodiment of the disclosure, if the device(s) 104 is an unconstrained device, then the questions can be presented to the user through the device(s) 104 itself. In an embodiment of the disclosure, the one or more questions presented to the user 102 and the corresponding device(s) 104 through at least one of voice, text, web and API or the like.

At operation 308, the method includes generating a score based on the response received from the at least one of the users 102 and the corresponding one or more devices 104 present in the IoT environment. The method allows the authenticating unit 208 to generate the score based on the response received from the at least one of the users and the corresponding one or more device(s) 104 present in the IoT environment.

At operation 310, the method includes authenticating the user 102 to access the one or more device(s) 104 based on the generated score. The method allows the authenticating unit 208 to authenticate the user 102 to access the one or more device(s) 104 based on the generated score. Based on the generated score, the authenticating unit 208 provides the level of access to the device(s) 104.

The various actions, acts, blocks, operations, or the like in the method and the flow diagram 300 may be performed in the order presented, in a different order or simultaneously. Further, in some embodiments, some of the actions, acts, blocks, operations, or the like may be omitted, added, modified, skipped, or the like without departing from the scope of the disclosure.

FIGS. 4, 5, 6, and 7 illustrate flow diagrams illustrating a method for authenticating a user in an IoT environment according to various embodiments of the disclosure.

Figure 4:
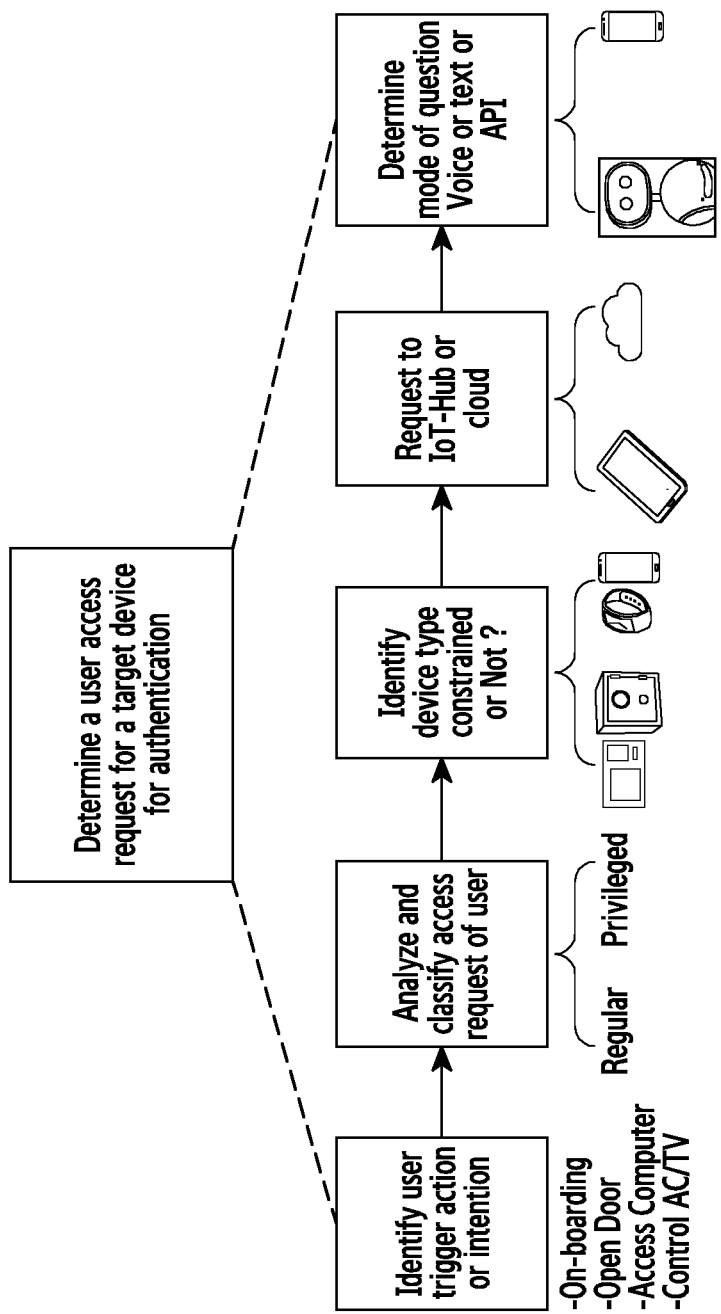
FIGS. 4, 5, 6, and 7 illustrate methods for authenticating a user in an IoT environment according to various embodiments of the disclosure.

Referring to FIG. 4, a method for determining the user 102 access request for the device(s) 104 present in the IoT environment for authentication is depicted. The user 102 requests access to the target device can be the user input to get access to the device(s) 104. For example, the user may want to open a door of a house, access a computer, control a television or air-conditioner or the like. The user input can be at least one of text, a phrase, a biometric input, voice, touch, a tap, double tap, drag, flip or the like. Based on the user input, the device(s) 104 can be configured to generate one or more questions to the user to provide authentication to the user to access the device(s) 104. Further, the method includes identifying the user access request to the device(s) 104. Further, the device(s) 104 can be configured to analyze and classify, whether the user access request to the device(s) 104 is regular or privileged. For example, if the user tries to access a locker, then the user access request can be considered to be a privileged request. For example, if the user is trying to access a TV or AC, then the user access request is considered to be a regular request. Further, the method includes identifying a type of the device(s) 104, i.e., identifying whether the device(s) 104 is a constrained device or an un-constrained device. Further, the method includes determining a mode of question for the user 102. If the determined device(s) 104 is a constrained device, the mode of questions can be at least one of a voice and API based thought the user assistant. If the determined device is a non-constrained device, the mode of questions can be at least one of voice, text web based and API based.

Figure 5:
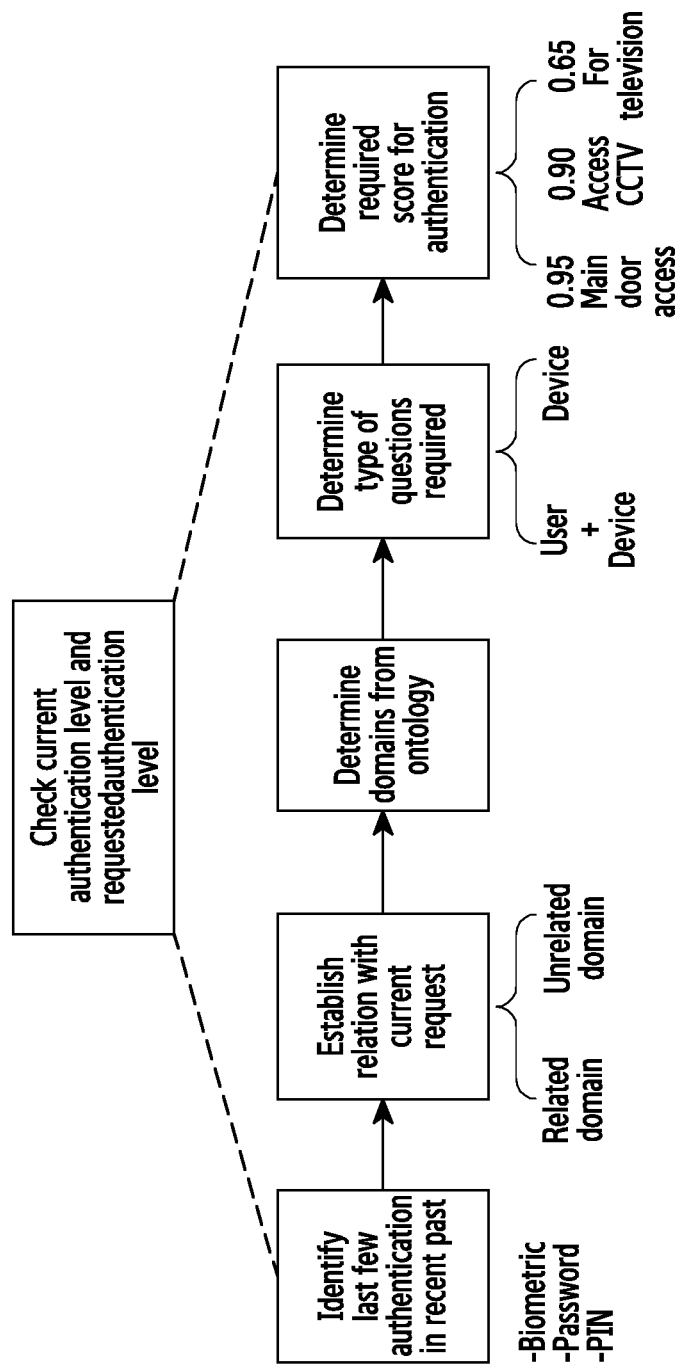

Referring to FIG. 5, a method for determining a current authentication level and a requested authentication level of the user 102 is depicted. The method includes identifying at least one prior authentication of the user 102. For example, the user 102 has opened a main door of a house a few minutes before, with his fingerprint authentication. Further, the method includes identifying the user's requested authentication level for the device(s) 104 present in the IoT environment. Further, the method includes establishing a relationship between the current authentication level and the requested authentication level. For example, the user has opened the door with his fingerprint and entered the house. Further, if the user wants to access less critical devices, such as AC and television, based on the previous authentication level the user may be given access to control the AC and the television. However, if the user 102 wants to access a locker inside the home, the user 102 always needs a PIN to get access to the locker. Further, the method includes determining domains from ontology to generate one or more questions. The domains can be related domains and unrelated domains. The ontology includes mapping of user data with the device(s) 104 data. From the ontology, the device(s) can derive related domain and unrelated domains questions for the user 102 and the device(s) 104 present in the IoT environment. For example, the user 102 has opened the main door through his fingerprint and the user 102 is trying to access the locker present in the home. Here, the last authentication and the requested authentication belong to the related domain 'home'. Further, the method includes determining a type of questions required to provide access to the user 102. Further, the method includes determining required score for authentication. The required score is to provide access to the user 102. The required score can be predefined for every device present in the IoT environment; for example, if the user wants to access the main door, the score should be 0.95. Similarly, to access CCTV, the score should be 0.90 and similarly to access TV, the score should be 0.65 or the like. The required score of a device in the IoT environment may be proportional to the authentication level of the device. For example, the required score of a device may be determined based on an authentication level of the device, or may correspond to the authentication level of the device. For example, the higher the require score of a device is, the higher the authentication level of the device becomes.

According to various embodiments of the disclosure, an authentication level can be defined for each device. The authentication level may correspond to one of a plurality of levels, such as 'regular', 'high' and 'privilege', where the authentication level 'high' is higher than the authentication level 'regular', and the authentication level 'privilege' is higher than the authentication level 'high'. The above stated authentication levels 'regular', 'high', and 'privilege' is just for illustration only, and there may be a plurality of authentication levels. The authentication level for a device can be determined based on at least one characteristic of the device. For example, the authentication level of a connected car can be 'high', since the connected car should be available for limited users like car owner. For another example, the authentication level of a door lock of a house can be 'privilege', since only limited users can enter the house, and the house is essential for the limited users. For another example, the authentication level for a laptop computer can be 'regular', since the laptop computer is allowed to be used for less limited users. In addition, the authentication level for each device can be set according to a user configuration. For example, the administrator of the authentication system can set authentication level for each device, and the set authentication level for each device can be stored in the authentication system (i.e., memory 212). The user can modify the authentication level for some devices, which means that the authentication level for a device is not permanent, but can be varied according to user configuration.

According to various embodiments of the disclosure, the type of questions comprises at least one of a device question, a user question, a combination of the device question and the user question, or a question skipping. The user question is a question that is valid for a user, and is supposed to be asked to the user. The user question comprises at least one of a user specific question and related user specific questions. The device question comprises device-to-device questions. The device-to-device questions can be determined based on device footprints and user responses to the user question (i.e., validating the user response by asking device-to-device questions. The question skipping means not providing at least one question to a user and one or more devices associated with the user for authenticating the user. For example, the question skipping represents an authentication without questioning.

According to various embodiments of the disclosure, the type of questions for at least one device whose authentication is triggered by a user can be determined based on at least one of a UI type of the at least one device, or an authentication level of the at least one device. The UI type represents whether the at least one device is equipped with a display or not, whether the at least one device is equipped with at least one component for a voice recognition (for example, microphone and/or speaker) or not, whether the at least one device is equipped with an input/output interface (for example, a password input receiving unit, a keyboard, and the like). For example, if a device is equipped with a display, the UI type of the device is 'display available'. For another example, if a device is equipped with at least one component for a voice recognition, the UI type of the device is 'voice available'. For another example, if a device is equipped with an I/O interface, the UI type of the device is 'I/O interface available'. For another example, if none of the display, the at least one component for a voice recognition and the I/O interface is available for a device, the UI type of the device is 'unavailable'.

For example, the type of questions for a connected car whose UI type is at least one of 'display available' and 'voice available', and authentication level is 'high', can be a combination of a user question and a device question. If the UI type of the connected car is 'unavailable', the type of questions for the connected car may be a device question even though its authentication is also 'high'. For example, the type of questions for a device can differ according to a UI type of the device.

For another example, the type of questions for a door lock of a house whose UI type is at least one of 'display available' and 'I/O available', and authentication level is 'privilege', can be a combination of a user question and a device question. For another example, the type of questions for a laptop computer whose UI type is at least one of 'display available' and 'I/O available', and authentication level is 'regular', can be a device question, even though the UI type of the laptop computer is the same as that of the door lock. For example, the type of questions for a device can differ according to an authentication level of the device.

If an authentication for the laptop computer whose authentication level is relatively low is triggered within a predetermined period time after an authentication for the door lock whose authentication level is relatively high is successfully completed, the type of questions for the laptop computer can be a question skipping. For example, since a user is given access to the house by correctly answering to the combination of user question and a device question, and the authentication level is guaranteed for the user for the predetermined period of time, the question for a device associated with a user accessing the laptop computer can be skipped and the user can be directly given the access to the laptop computer.

Figure 6:
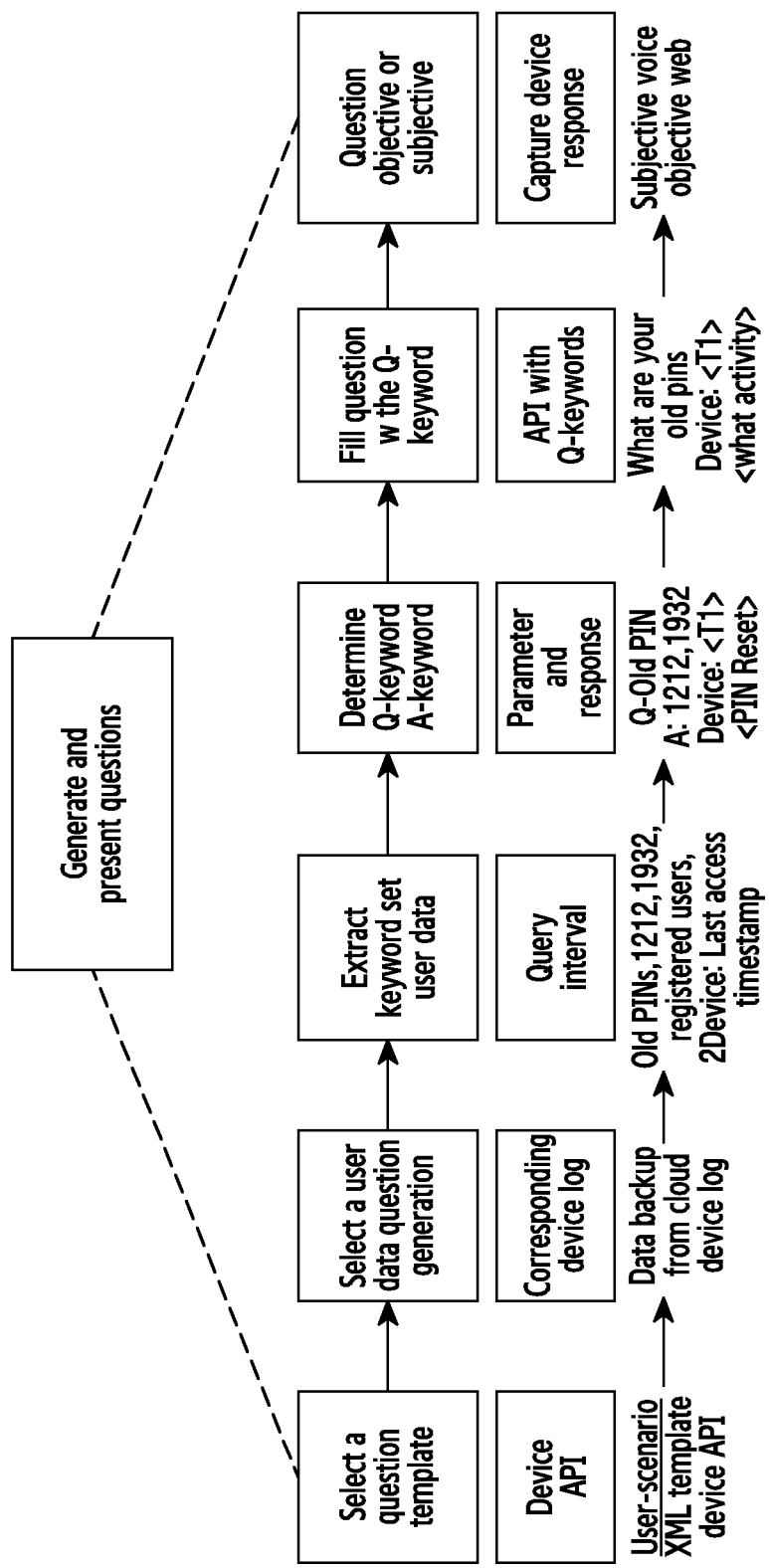

Referring to FIG. 6, a method for generating and presenting questions to at least one of the user 102 and the corresponding device(s) in the IoT environment is depicted. The device(s) 104 can be configured to generate the questions, when the user 102 is trying to access the device(s) 104. The device(s) 104 can be configured to request the storage unit 108 to generate the user 102 questions, where the user data is stored. The device(s) (104) can be configured select a question template to generate the user 102 questions, for example the question template can be an XML, template Further, the device(s) 104 can be configured to select the user 102 data stored in the storage unit 108 to generate the questions. Further, the device(s) 104 can be configured to extract the keyword set from the user data. Based on the user 102 data, the device(s) 104 can be configured to extract question (Q) keywords and answer (A) keywords from the user data. Further, the device 104 can be configured to fill the template with the Q-keywords to generate the user questions, and then the device(s) 104 can be configured to present the question to the user. The questions can be at least one of objective and subjective.

For example, consider a user scenario: selecting an XML template→choosing a data backup from storage unit 108→extracting keyword set form the user data question available in data backup (i.e., Old PINs, 1212, 1932, registered users, 2 device)→extracting Q-keywords and A-keywords from the data backup→generating the questions from the extracted Q-keywords and presenting to the user for a response. The generated questions are presented to the user 102 in the form of subjective voice or objective web or the like.

Similarly, the device(s) 104 questions can be generated using the API of the device(s) 104. The device(s) 104 API can be configured to interact with the log of the device(s) 104 and query for the device(s) logs data to generate the device questions for the corresponding devices present in the IoT environment. Further, the device(s) API can be configured to extract parameters and responses from the device logs to generate the questions with Q-keywords from the parameters extracted from the device log. Further, the device can be configured to present the questions to the corresponding devices for response.

For example, consider a user scenario: Device API access-→Device log→identifies keyword sets i.e., Device: last access timestamp→extract Q-keywords (parameters) and A-keywords (response) i.e., Device: <T1> <PIN Reset>→generating by the API, the questions for the corresponding devices by filling Q-keywords i.e., device: <T1> <what activity>.

Figure 7:
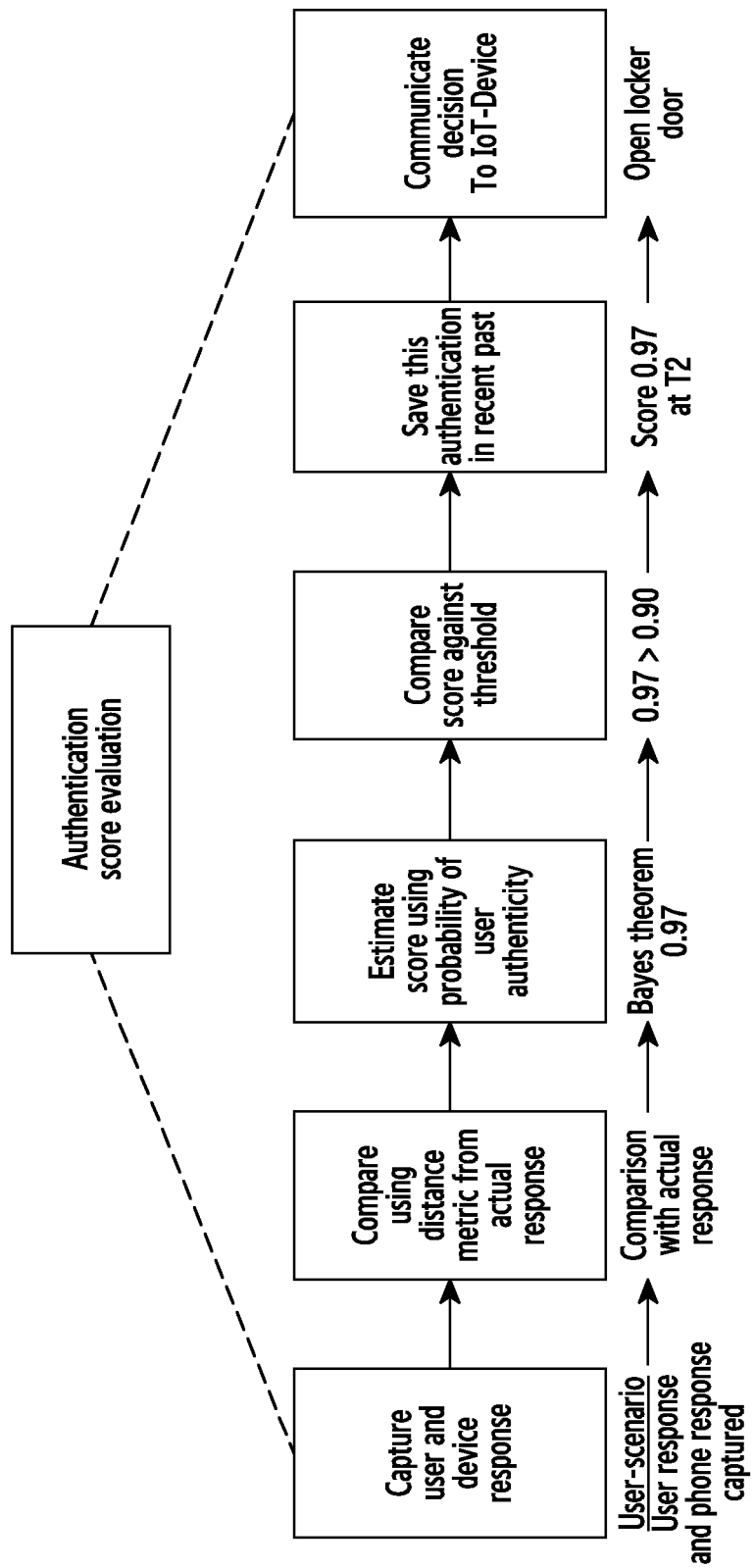

Referring to FIG. 7, a method for authenticating the user 102 based on the response received from the user 102 and the corresponding devices present in the IoT environment is depicted. Once the questions are generated and presented to the user 102 and the corresponding devices present in the IoT environment. Once the questions are presented to the user 102 and the corresponding device(s) 104, the device(s) 104 can be configured to receive the response from the user 102 and the corresponding device(s) 104. On receiving the response from the user 102 and the corresponding device(s) 104, the device(s) 104 can be configured to compare the response received from the user 102 and the corresponding device(s) 104 with actual response using distance metrics. Further, the device(s) 104 can be configured to estimate the score based on the response received from the user 102 and the corresponding devices(s) 104 present in the IoT environment using probability of user authenticity, which can be estimated using Bayes theorem. The Bayes theorem can be used to estimate the probability of user authenticity with each iteration of questions and corresponding user responses and device responses till the probability reaches a threshold of acceptance or rejection. Further, the method includes comparing the generated score with a threshold. If the generated score is equal to the threshold/more than the threshold, the user can be successfully authenticated and the same can be communicated to the device(s) 104 to provide access to the user 102.

Figure 8:
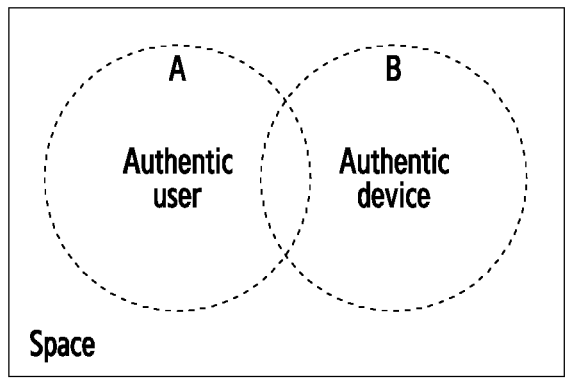
FIG. 8 illustrates a process of estimating a user authenticity using Bayes theorem/rule according to an embodiment of the disclosure.

FIG. 8 illustrates a process of estimating a user authenticity using Bayes theorem/rule according to an embodiment of the disclosure.

Referring to FIG. 8, the embodiments herein can use Bayes theorem/rule, wherein P(A|B) & P(B|A) can be estimated with every iteration of questions and corresponding user 102 and the device(s) 104 responses in questionnaire till the probabilities reach a threshold of acceptance or rejection. The P (A) is the probability of the user 102 being an authentic user and can be estimated based on nearness of user-response from actual or expected response. The P(B) is the probability of the device(s) 104 being authentic device and can be estimated based on nearness of the response of device(s) 104 from the actual or expected response. The P(B|A) is the probability of the device(s) 104 being an authentic device for a given authentic user. This can be estimated by asking precise questions based on user-response. Metric could be the distance between device(s) 104 response and the user 102 response. P(A|B) is the probability of the user 102 being an authentic user for a given authentic device(s) 104.

Embodiments herein can use a maximum likelihood principle. This approach for user authentication includes observed user response and device(s) response against each question, which can be considered as new sample points. Using maximum likelihood principle (MLE), parameters could be estimated such that probability of the user 102 being an authentic user using maximum given sample data (which can comprise of responses from the user and/or device). Embodiments herein can compare the distance of estimated parameters to the true parameters (which can be estimated from historic user data or expected user/device response). As per MLE, the estimated parameters should converge to the true parameters. Consider that Q represents the set of questions in the questionnaire $\{Q_0, Q_1, Q_2, \ldots, Q_n\}$ $$Q(Uq, Dq) = \begin{bmatrix} \text{User} - \text{Question} \\ \text{Device} - \text{Question} \end{bmatrix} \quad \text{Equation 1}$$

$$Q(Ur, Dr) = \begin{bmatrix} \text{User} - \text{Response} \\ \text{Device} - \text{Response} \end{bmatrix} \quad \text{Equation 2}$$

R represents the set of expected or correct responses $\{R_0, R_1, R_2, \ldots, R_n\}$. r represents the set of actual user or device responses $\{r_0, r_1, r_2, \ldots, r_n\}$.

In another approach using the maximum likelihood principle, $$r1 = \begin{bmatrix} U_1 \\ D_1 \end{bmatrix} \quad \text{Equation 3}$$

r represent set of actual user or device responses $\{r_0, r_1, r_2, \ldots, r_n\}$. Further, based on observed samples of $r_0, \ldots, r_n$, a parameter can be calculated using MLE, which maximizes the probability of over serving this sample.

$$f(x1, x2, \ldots, xn \mid \theta) = f(x1 \mid \theta) \times f(x2 \mid \theta) \ldots \times f(xn \mid \theta). \quad \text{Equation 4}$$

$$\ln L(\theta; x1, \ldots, xn) = \sum_{i=1}^{n} \ln f(x_i \mid \theta),$$

$$\{\hat{\theta} mle\} \subseteq \left\{ \arg\max_{\theta \in \Theta} \hat{\ell}(\theta; x1, \ldots, xn) \right\}$$

OR $$P(\theta \mid x1, x2, \ldots, xn) = \frac{f(x1, x2, \ldots, xn \mid \theta) P(\theta))}{P(x1, x2, \ldots, xn)}$$

The true value of the parameter can be estimated from historic data or the expected response. The user 102 evaluation or score can be decided based on below equations:

$$\hat{\theta} mle \xrightarrow{P} \theta_0. \quad \text{Equation 5}$$

OR $$\hat{\theta} mle \xrightarrow{a.s.} \theta_0. \quad \text{Equation 6}$$

Embodiments herein can use the Wlad test by relying on the symptomatic normality of the MLE ($\hat{\alpha}$), the test statistic is calculated as $$Z_0 = \frac{\hat{\alpha} - \alpha_0}{\sqrt{\vartheta(\hat{\alpha})}} \quad \text{Equation 7}$$

which is asymptomatically distributed as N (0,1) under $H_0$. $H_0$ is the hypothesis that the user is authentic based on the given response.

Embodiments herein can use the likelihood-ratio test. Employing the log likelihood ratio, the test statistic $$G_0^2 \equiv -2\log_e \frac{L(\alpha 0)}{L(\hat{\alpha})} = 2[\log_e L(\hat{\alpha}) - \log_e L(\alpha_0)] \quad \text{Equation 8}$$

is asymptomatically distributed as $X_1^2$ under $H_0$.

Embodiments herein can use the score test. The score is the slope of the log-likelihood at a particular value of $\alpha$, that is $$S(\alpha) \equiv d \log_e L(\alpha)/d\alpha \quad \text{Equation 9}$$

At the MLE, the score is 0 as follows $$S(\hat{\alpha}) = 0 \quad \text{Equation 10}$$

It can be shown that the score statistic ($S_0$) is $$S_0 \equiv \frac{S(\alpha_0)}{\sqrt{X(\alpha_0)}} \quad \text{Equation 11}$$

is asymptomatically distributed as N(0,1) under $H_0$.

Figure 9:
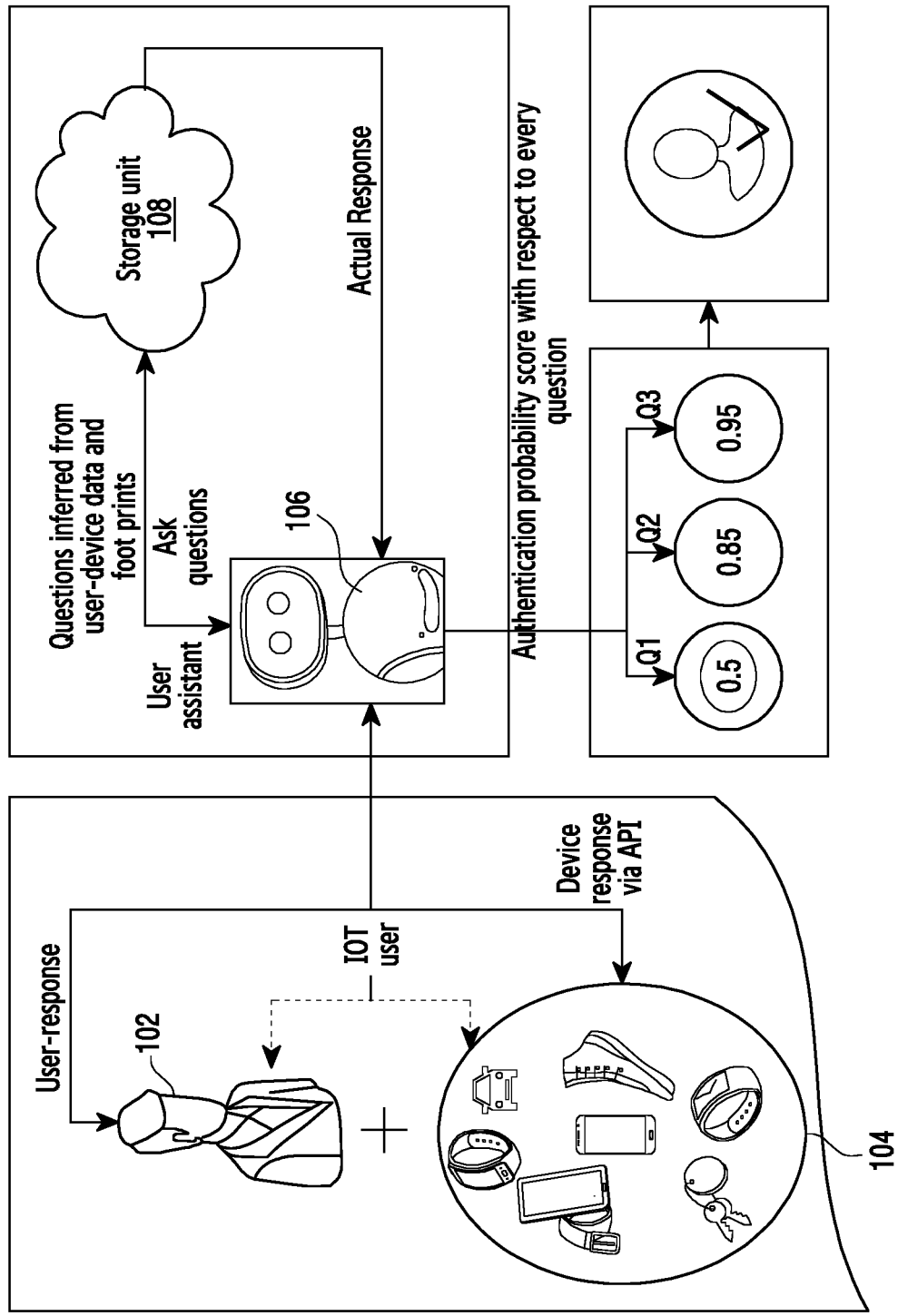
FIG. 9 illustrates seamless authentication of a user in an IoT environment according to an embodiment of the disclosure.

FIG. 9 illustrates seamless authentication of a user in an IoT environment according to an embodiment of the disclosure.

Referring to FIG. 9, embodiments herein can perform seamless authentication of the user 102 in an IOT environment. Initially, the user 102 is trying to access a device(s) 104 present in the IoT environment. Further, the device(s) 104 present in the IoT environment can be configured to generate a set of multi-dimensional questionnaire(s) for the user 102 and the one or more devices possessed by the user in the IoT environment. Further, the user can be presented with one or more questions to establish primary confidence. Later corresponding one or more devices (related to the user's response) present in the IoT environment can be presented (asked/queried) with a sequence of question(s) through the API to get precise response to establish the identity of the user 102. This questionnaire(s) will gain confidence through the one or more devices response at higher granularity. Also, near or related devices can be chosen, so that the device(s) 104 present in the IoT environment can ask question to another-related IoT device possessed by the user 102. In an embodiment of the disclosure, the at least one question can be presented to the user 102 by the user assistant 106. The one or more questions can be developed using data, such as device footprints, application footprint, application logs, device logs, user logs and past user data. Seamless querying could be responded by connecting the at least one device to corresponding clouds (public or private) for the validation based on historic data. Also, if user's identity is established once, seamless accessibility to the at least one device, functionality, system could be given to the user 102 just by validating the at least one device carried by the user. The user's activity could also play a role in generating questions and device selection.

The embodiments herein can identify and authorize the user 102 among multiple legitimate users of a device/system to provide customized access to the user. Embodiments herein can continuously authenticate the user 102 with minimal user authentication. Embodiments herein can leverage the at least one device response to establish higher accuracy with approximate user-response. Embodiments herein can infer information about the user from related or other user's data, user-specific data or reference in other user's log with respect to each other.

The embodiments herein can validate a user's identity by calculating the score based on the questionnaire. In an embodiment of the disclosure, the questionnaire can be presented in at least one of voice, text, message or the like. The questionnaire can be prepared for the user and/or a set of user-devices. The questionnaire can comprise at least one question, inferred from at least one of the users or at least one device activity/data/logs, data-inference from the storage unit 108, or from various interdependent domains/devices. The score can be derived using the probabilities of user's response and the devices response. Based on the score, access-level of a user can be decided.

Figure 10:
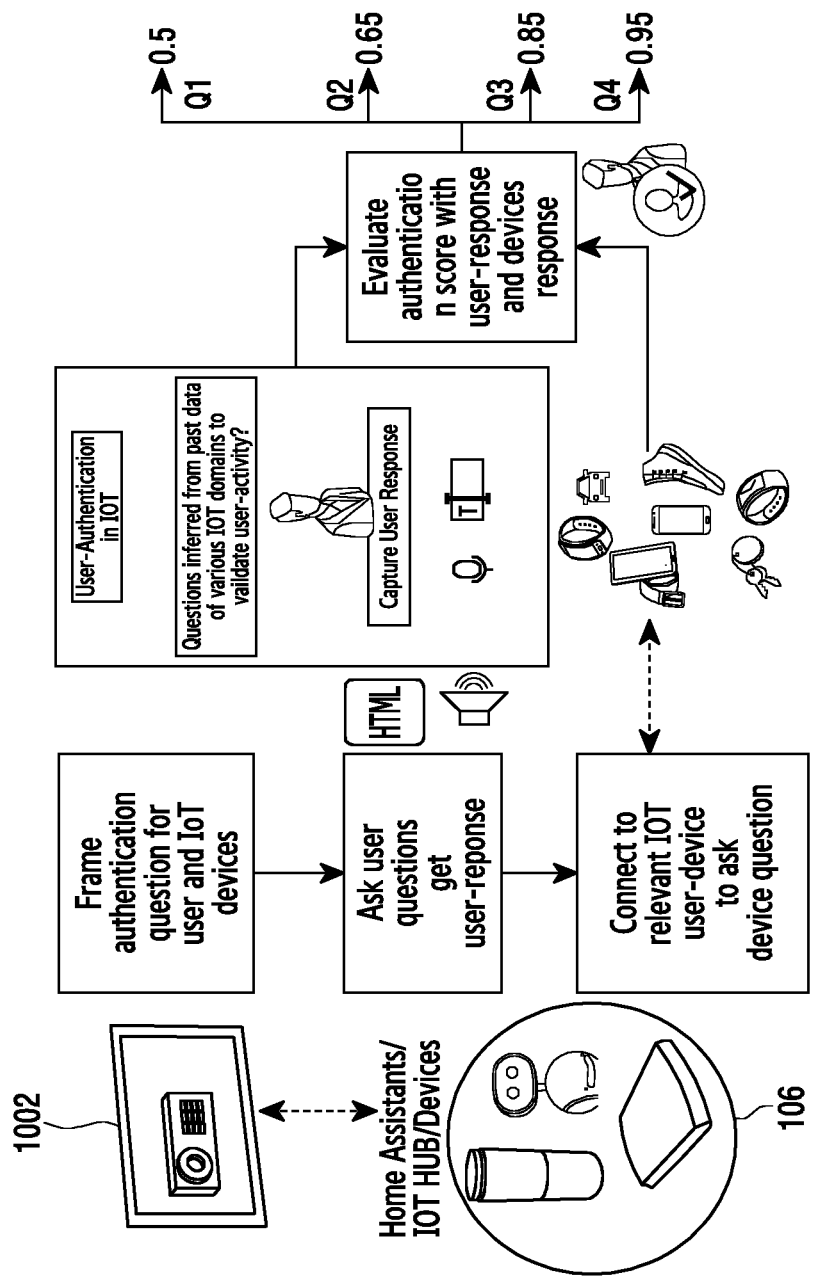
FIG. 10 illustrates authenticating a user by a locker in an IoT environment according to an embodiment of the disclosure.

FIG. 10 illustrates authenticating a user by a locker in an IoT environment according to an embodiment of the disclosure.

Referring to FIG. 10, embodiments herein can perform seamless authentication of the user 102 in an IOT environment. Initially, the user 102 is trying to access a locker 1002 present in the IoT environment. Further, the locker 1002 present in the IoT environment can be configured to generate a set of multi-dimensional questionnaire for the user 102 and the one or more devices (for example, phone, gear, ring, smart-belt, smart shoes or the like) possessed by the user in the IOT environment. Further, the user can be presented with one or more questions to establish primary confidence. Later corresponding one or more devices (related to the user's response) present in the IoT environment can be presented (asked/queried) with a sequence of question(s) through an API to get precise response to establish the identity of the user 102. This questionnaire will gain confidence through the one or more devices response at higher granularity. Also, near or related devices can be chosen, so that the one or more devices present in the IOT environment can ask question to another-related IOT device possessed by the user 102. In an embodiment of the disclosure, the at least one question is presented to the user 102 by the user assistant 106. The one or more questions can be developed using data, such as device footprints, application footprint, application logs, device logs, user logs and past user data. Seamless querying can be responded by connecting the at least one device to corresponding storage unit 108 (for example, public or private clouds) for the validation based on historic data.

The embodiments herein can validate a user's identity by calculating the score based on the questionnaire. In an embodiment of the disclosure, the questionnaire can be presented in at least one of voice, text, message or the like. The questionnaire can be prepared for the user and/or a set of user-devices. The questionnaire can comprise of at least one question, inferred from at least one of the users or at least one device activity/data/logs, data-inference from the storage unit 108, or from various interdependent domains/devices. The score can be derived using the probabilities of user's response and the devices response. Based on the score, access-level of a user can be decided.

Figure 11:
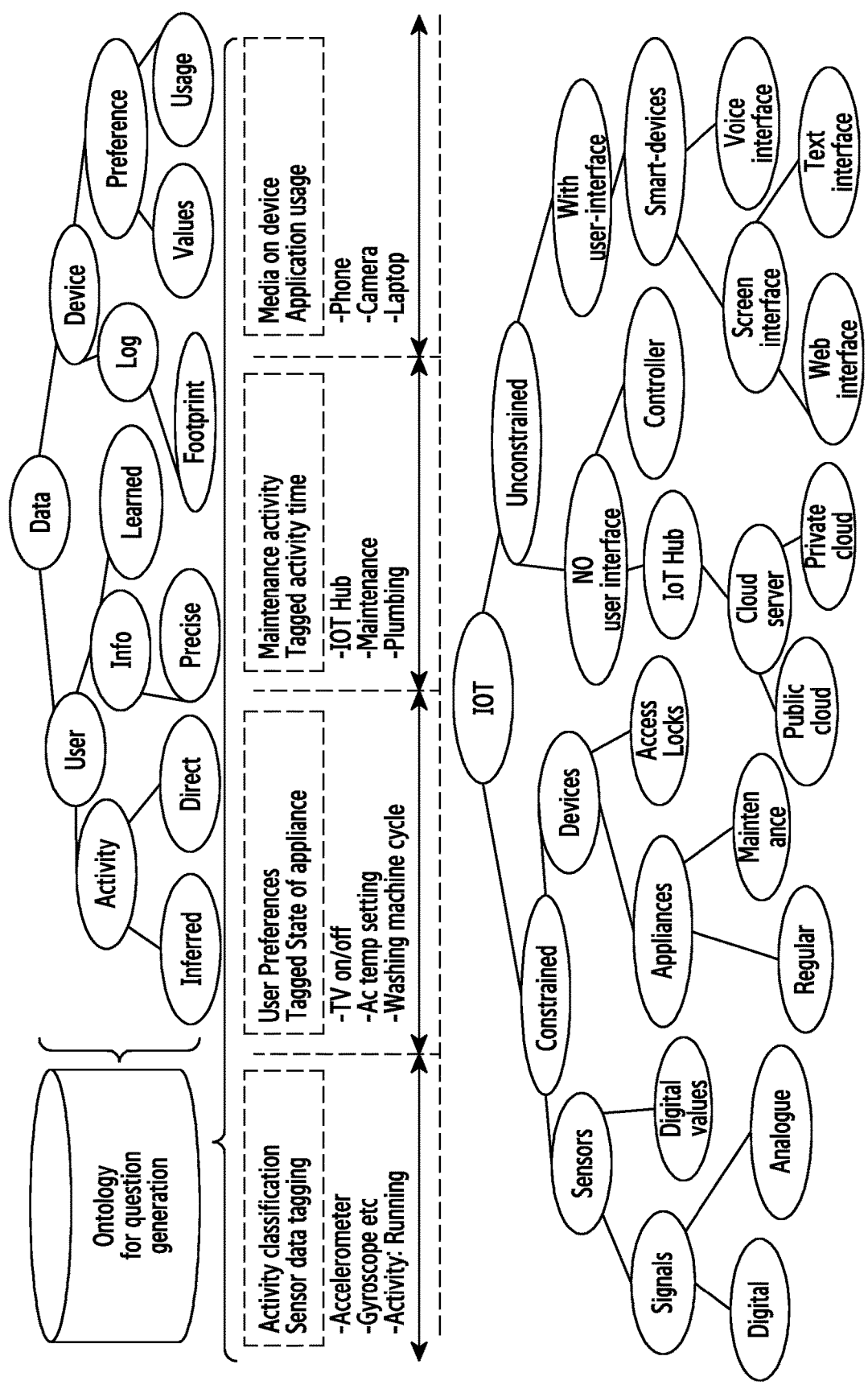
FIG. 11 illustrates generating ontology in an IoT environment according to an embodiment of the disclosure.

FIG. 11 illustrates generating ontology in an IoT environment according to an embodiment of the disclosure.

Referring to FIG. 11, the ontology broadly represents the ontology of IoT data and IoT domain. The user 102 in the IoT environment interacts with primarily two types of devices which are smart (unconstrained) and headless (constrained) for any activity. Hence, an activity data could be derived through various type of output/data/signal generated out of these devices. Some of the devices give precise information of state being changed (for example, door open/close) while other provide a signal. Further, the activity data derived from the signaling data can be classified or inferred based on machine learning (ML) techniques (for example, cycling, running, sleeping). Thus, the ontology present in the FIG. 11 is a broad representation of user 102 activity data ontology generated using data from the IoT devices 104 present in the IoT environment. Further, the generated ontology can be used for generating the questions.

Figure 12:
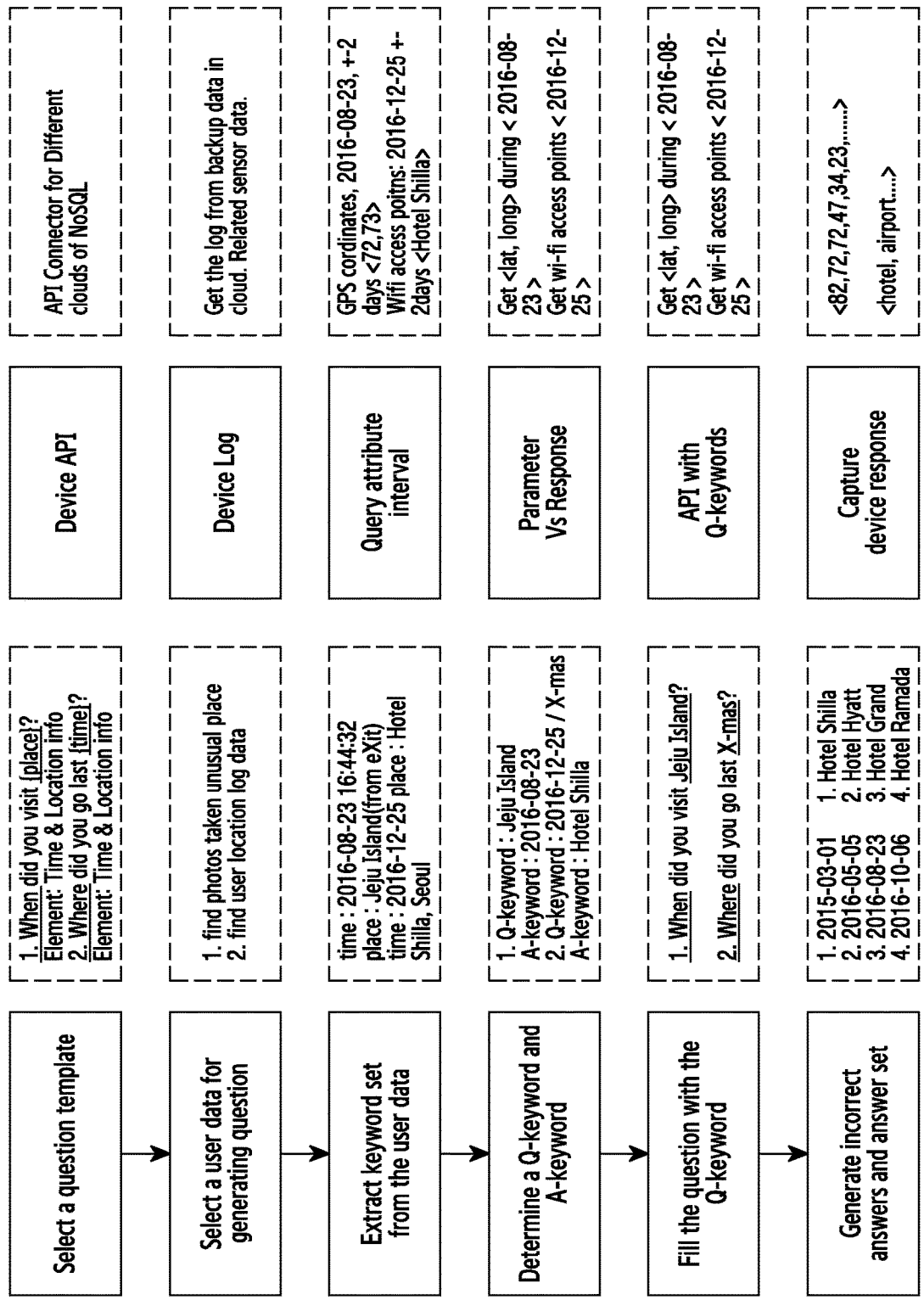
FIG. 12 illustrates generating questions using a question template according to an embodiment of the disclosure.

FIG. 12 illustrates generating questions using a question template according to an embodiment of the disclosure.

Referring to FIG. 12, the embodiments herein generate the questions when the user 102 is trying to access the device(s) 104. The device(s) 104 can be configured to request the storage unit 108 to generate the user 102 questions. The device(s) 104 can be configured select a question template to generate the user 102 questions. Further, the device(s) 104 can be configured to select the user 102 data stored in the storage unit 108 to generate the questions. Further, the device(s) 104 can be configured to extract the keyword set from the user data. Based on the user 102 data, the device(s) 104 can be configured to extract question (Q) keywords and answer (A) keywords from the user data. Further, the device 104 can be configured to fill the template with the Q-keywords to generate the user questions. Further, the device 104 can be configured to generate incorrect answers and correct answer. Further, the device(s) 104 can be configured to present the question to the user. The questions can be at least one of objective and subjective.

Similarly, the device(s) 104 questions can be generated using the device(s) 104 API. The device(s) 104 API can be configured to interact with the device(s) 104 log and query for the device(s) logs data to generate the device questions for the corresponding devices present in the IoT environment. Further, the device(s) API can be configured to extract parameters and responses from the device logs to generate the questions with Q-keywords from the parameters extracted from the device log. Further, the device can be configured to present the questions to the corresponding devices for response.

Figure 13:
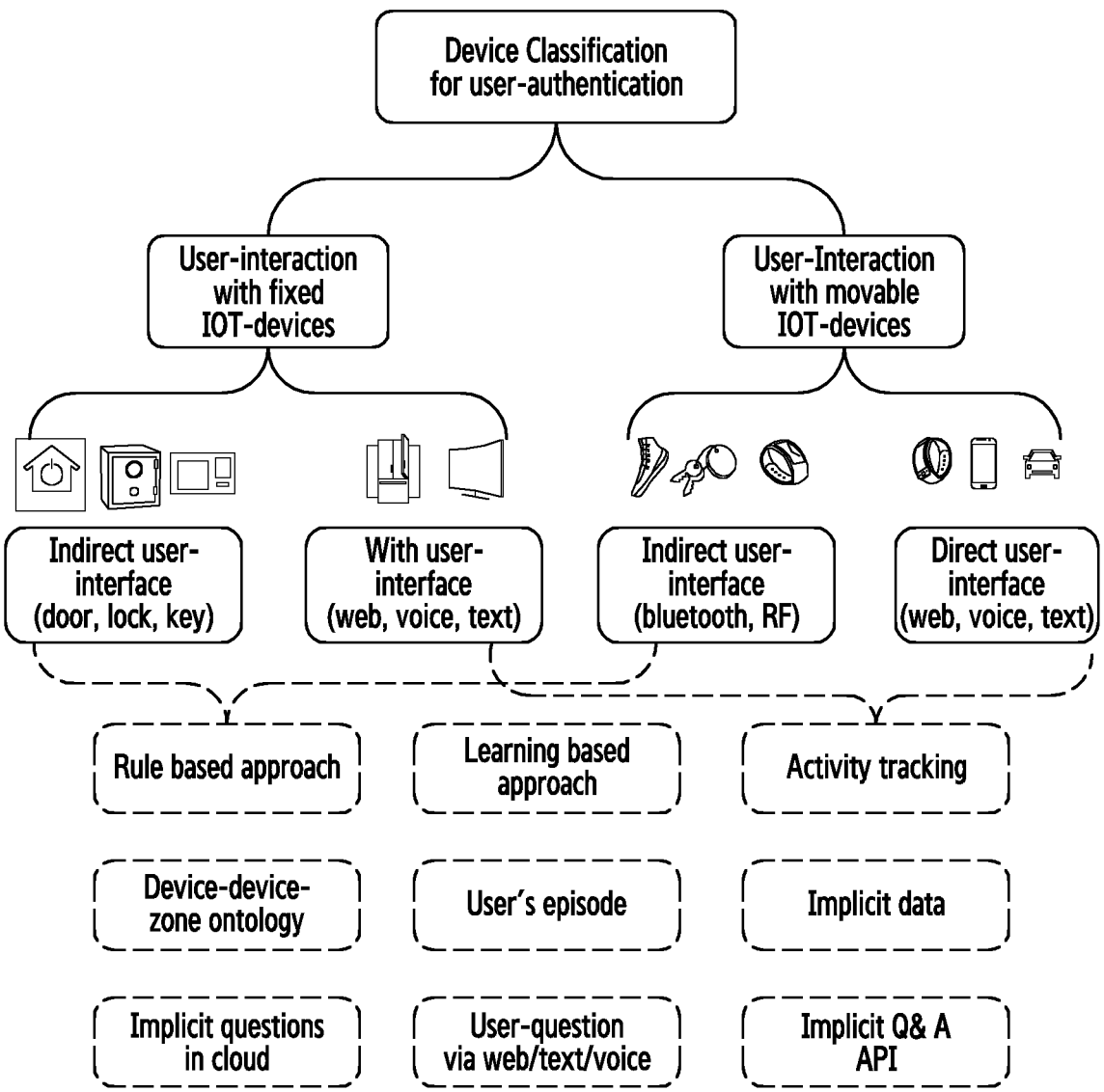
FIG. 13 illustrates classifying a device(s) in an IoT environment according to an embodiment of the disclosure.

FIG. 13 illustrates classifying device(s) in an IoT environment according to an embodiment of the disclosure.

Referring to FIG. 13, the device(s) 104 present in the IoT environment can be classified based on the device(s) 104 with explicit UI (for example, TV, Web, liquid crystal display (LCD) or the like) and the device(s) 104 with no UI (For example like, keys, locks or the like). With this information, there is a broad representation of how a combination of rule based and machine learning based techniques can be used to identify related devices in IoT domain. Once these related devices are identified, authentication using question and answer can be facilitated.

Figure 14:
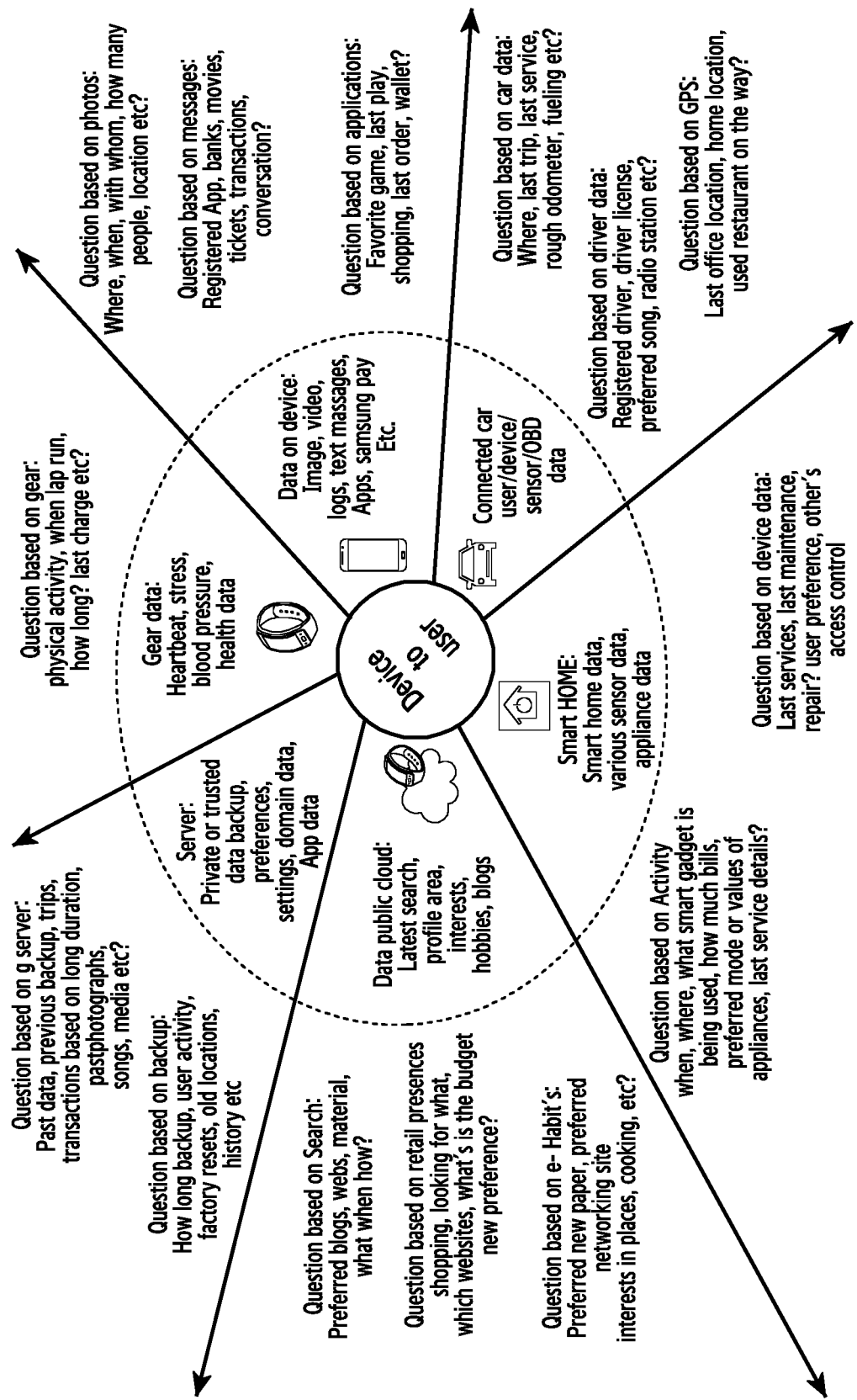
FIG. 14 illustrates generating device to user questions according to an embodiment of the disclosure.

FIG. 14 illustrates generating device to user questions according to an embodiment of the disclosure.

Referring to FIG. 14, the device(s) 104 to user questions can be generated based on information stored in a server (private, trusted) (i.e., data backup, preferences, settings domain data, and application data). Further, the device(s) 104 to user questions can be generated based on data present in a public cloud (i.e., latest search information, profile areas, interests, hobbies and blogs or the like). Further, the device(s) 104 to user questions generated based on smart home information (i.e., sensor information, application data or the like). Further, the device(s) 104 to user questions are generated based on connected car information. Further, the questions can be generated based on data on various devices present in the user 102 IoT environment.

Figure 15:
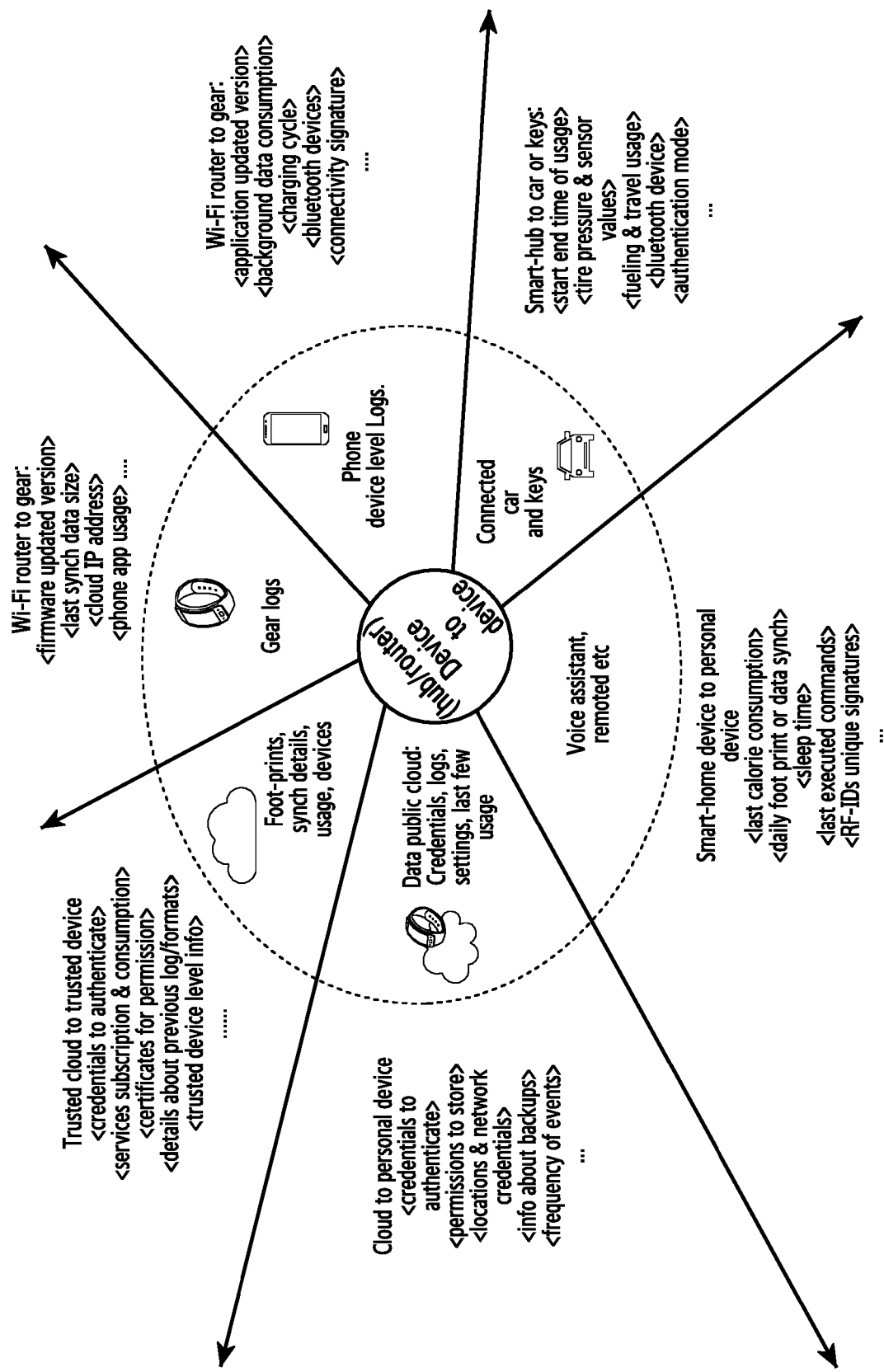
FIG. 15 illustrates generating device to device questions according to an embodiment of the disclosure.

FIG. 15 illustrates generating device to device questions according to an embodiment of the disclosure.

Referring to FIG. 15, the device to device questions can be generated based on device(s) 104 footprints, device(s) 104 synchronization details, device(s) 104 usage information or the like. Further, the device to device questions can be generated based on device(s) 104 log information, connected car information, voice assistant and remotes information or the like.

Figure 16:
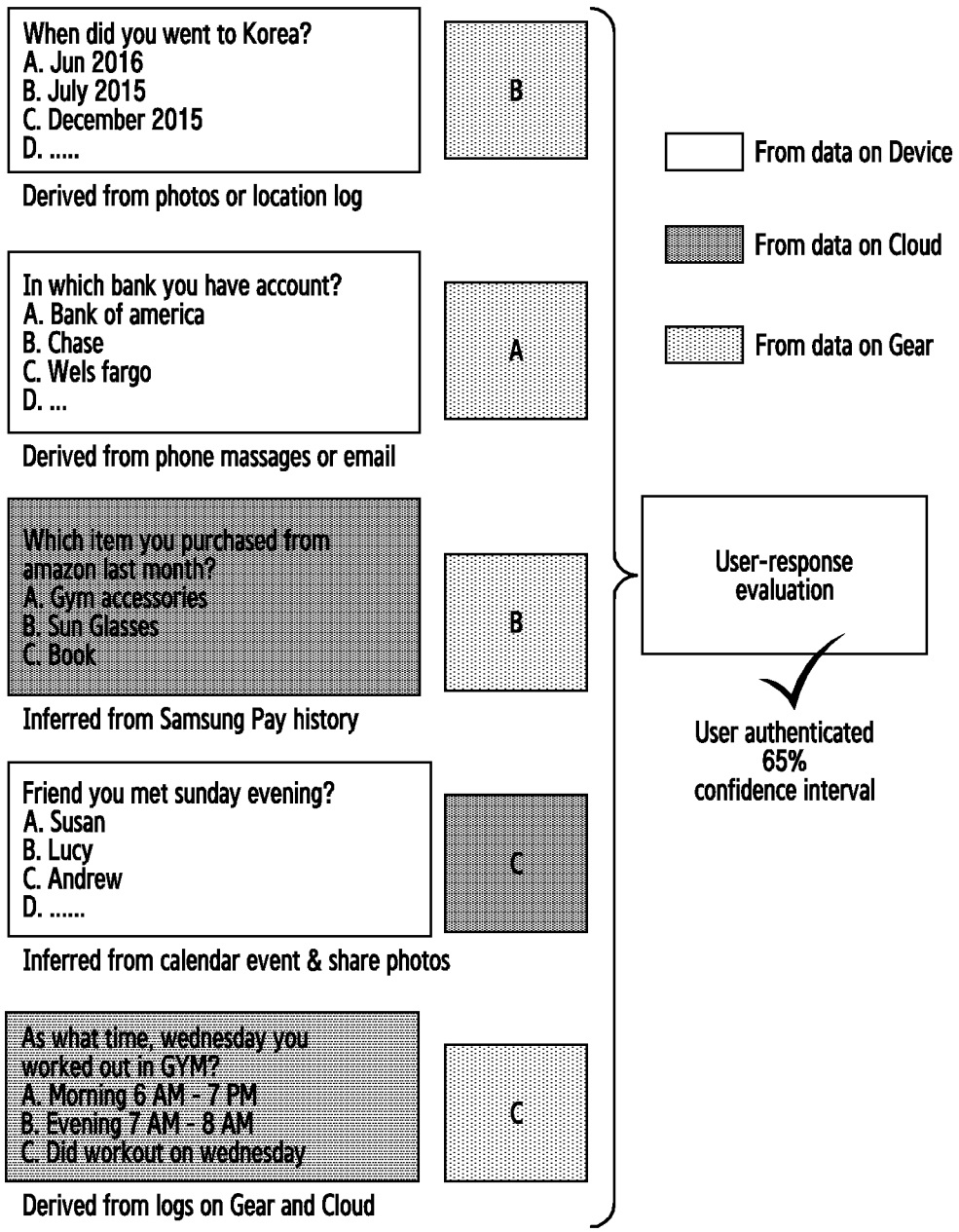
FIG. 16 illustrates authenticating a user by generating questions across domains based on user data according to an embodiment of the disclosure.

FIG. 16 illustrates dynamically generating questions to authenticate a user wherein questions can be generated across domains based on the user data according to an embodiment of the disclosure.

Referring to FIG. 16, the user data can be stored in at least one of the device(s) 104 and storage unit 108 or the like. Further, based on a user 102 response to the generated questions, score can be generated. Based on the score generated, the user 102 can be authenticated.

Figure 17:
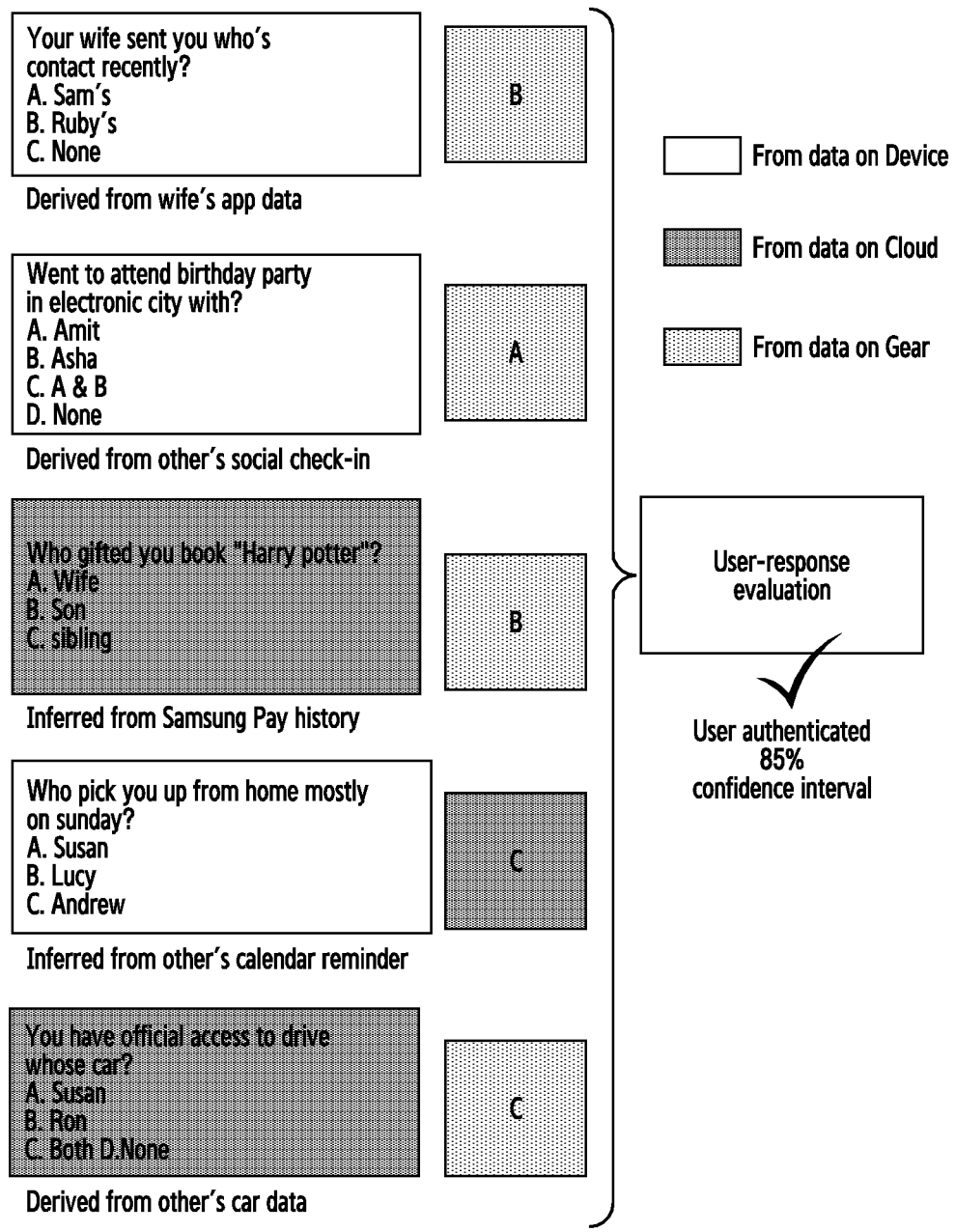
FIG. 17 illustrates authenticating a user by generating questions across domains based on related user data or group activity according to an embodiment of the disclosure.

FIG. 17 illustrates dynamically generating questions to authenticate a user wherein questions can be generated across domains based on related user data or group activity according to an embodiment of the disclosure.

Referring to FIG. 17, based on the user 102 response to the generated questions, score can be generated. Based on the score generated, the user 102 can be authenticated.

Figure 18:
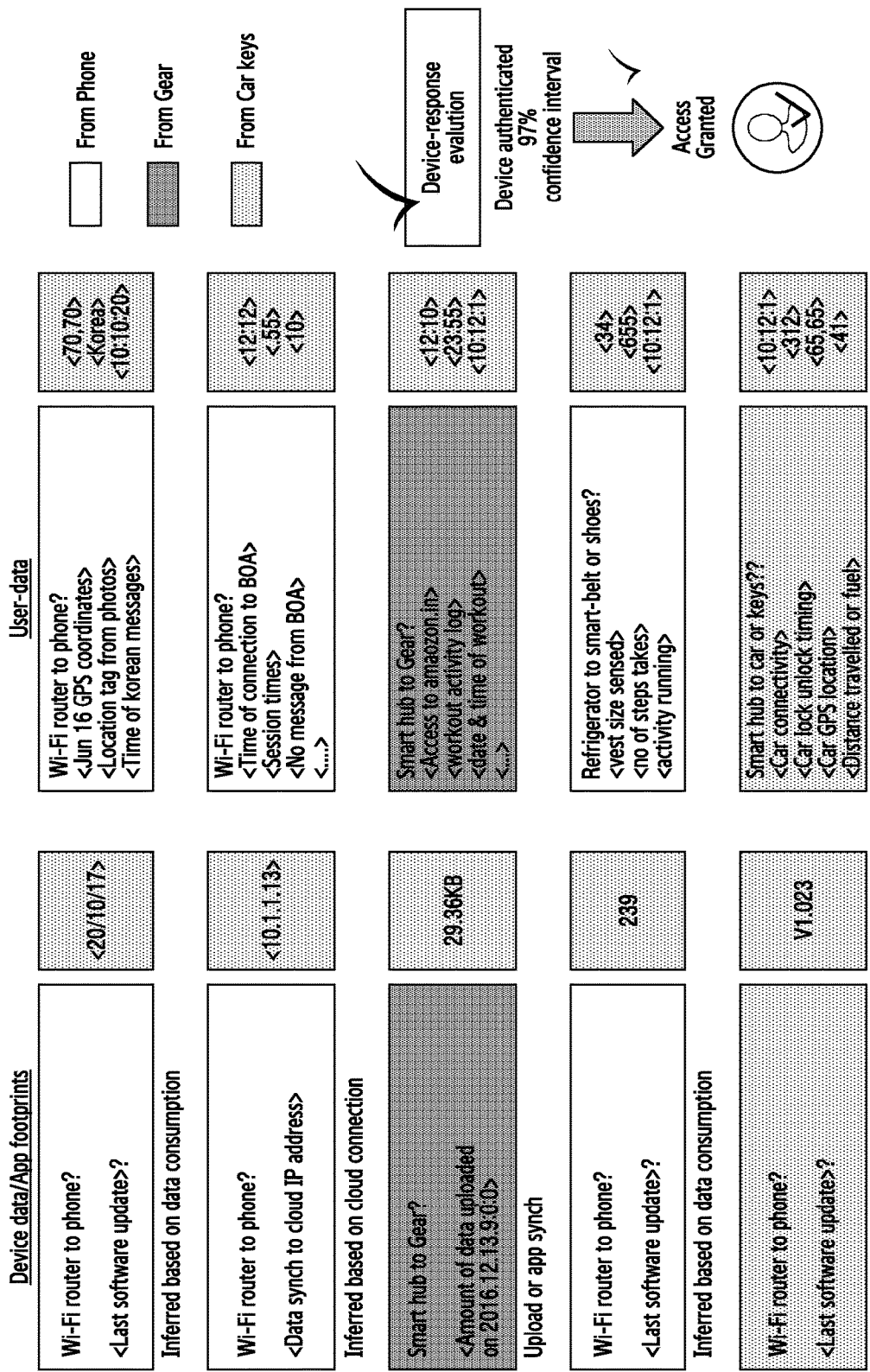
FIG. 18 illustrates authenticating a user by generating questions for device(s) based on a user response according to an embodiment of the disclosure.

FIG. 18 illustrates authenticating a user by generating questions for device(s) based on a user response according to an embodiment of the disclosure.

Referring to FIG. 18, the questions can be generated on the device data/application footprints and user data. Further, based on the devices 104 response to the generated questions, score can be generated. Based on the generated score, the user 102 can be authenticated.

FIG. 19 illustrates authenticating a user by generating user questions and device(s) questions according to an embodiment of the disclosure.

Referring to FIG. 19, based on the generated user questions and the device question, a response received from the corresponding user 102 and the corresponding devices present in the IoT environment to generate a score. Further, based on the generated score the user 102 can be authenticated.

Figure 20:
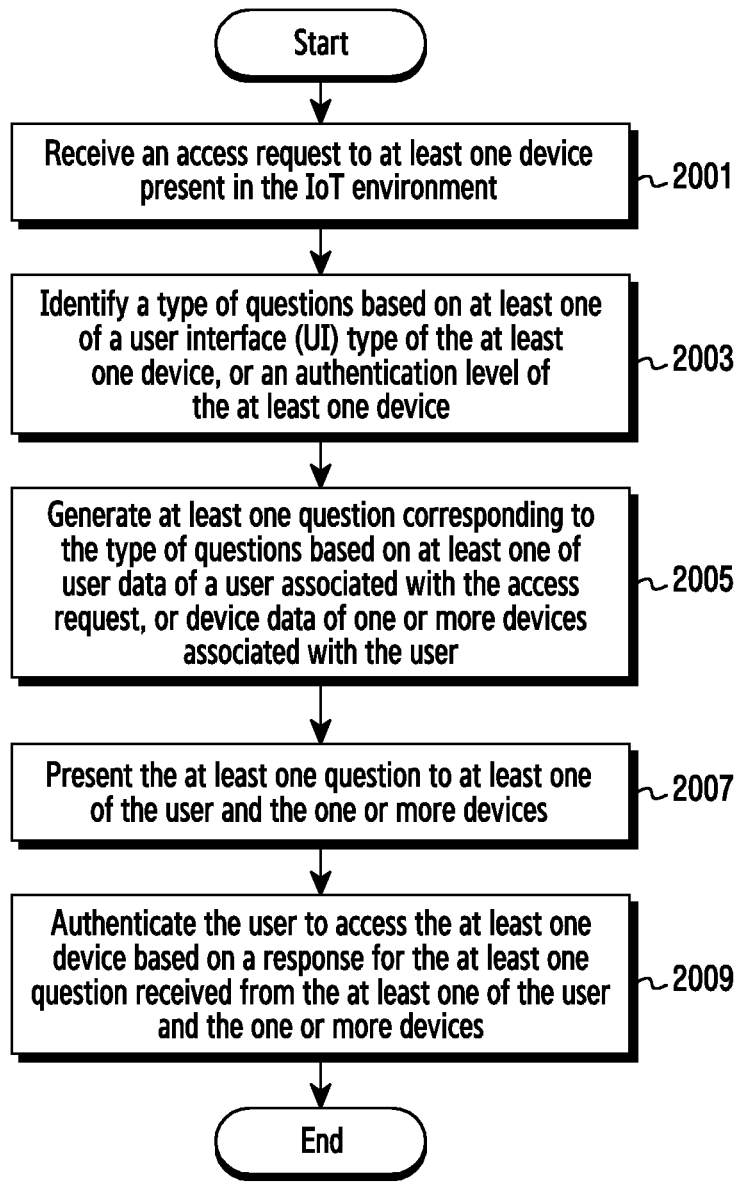
FIG. 20 is a flow chart of a method for authenticating users in an IoT environment according to an embodiment of the disclosure.

FIG. 20 is a flow chart of a method for authenticating users in an IoT environment according to an embodiment of the disclosure. FIG. 20 illustrates a method implemented by the authentication system 100.

Referring to FIG. 20, at operation 2001, the input receiving unit 202 receives an access request to at least one device present in IOT environment. The access request to a device can be construed as an authentication trigger for the device. For example, the access request to a connected car can be a start-up attempt to the connected car, the access request to a door lock of a house can be an unlock key trial to the door lock, the access request to a laptop computer can be a power-on of the laptop computer.

At operation 2003, the question generating unit 204 identifies a type of questions based on at least one of a UI type of the at least one device, or an authentication level of the at least one device. The type of questions comprises at least one of a device question valid for a device, a user question valid for a user, a combination of the device question and the user question, or a question skipping representing an authentication without questioning. The UI type represents at least one of whether the at least one device is equipped with a display, whether the at least one device is equipped with at least one component for a voice recognition, or whether the at least one device is equipped with an input/output (I/O) interface.

At operation 2005, the question generating unit 204 generates at least one question corresponding to the type of question based on at least one of user data of a user associated with the access request, or device data of one or more devices associated with the user. The at least one question is generated based on an ontology mapping of the user data and the device data. The question generating unit 204 generates the user question by receiving a predefined question template, extracting at least one keyword set from the user data, determining at least one question keyword from the user data, and generating the user question based on the at least one question keyword. The question generating unit 204 generates the device question by triggering API to access the device data present in at least one of a device log, historic data, or a device record for the one or more devices, querying at least one of the device log, the historic data, or the device record for the device to extract at least one question keyword from the device data, generating the device question based on the at least one question keyword, and presenting the generated device question to the one or more devices. If the type of questions is identified to be a question skipping, the operation 2005 can be omitted.

At operation 2007, the question presenting unit 206 presents the at least one question to at least one of the users and the one or more devices. The question presenting unit 206 presents the at least one question to the user by at least one of the at least one device, a user assistant, and the IoT hub. The question presenting unit 206 presents the at least one question to the user through at least one of a voice and a textual mode. The question presenting unit 206 presents the at least one question to the one or more devices by an API. If the type of questions is identified to be a question skipping, the operation 2007 can be omitted.

At operation 2009, the authenticating unit 208 authenticates the user to access the at least one device based on a response for the at least one question received from the at least one of the users and the one or more devices. The authenticating unit 208 authenticates the user by receiving the response for the at least one question from the at least one of the user and the one or more devices, comparing the response with an actual response using a distance metric to estimate a score based on a probability of a user authenticity, comparing the score with predefined scores to provide a level of access to the user, and providing a level of access to the user based on the score. If the type of questions is identified to be a question skipping, the authenticating unit 208 authenticates the user to access the at least one device without considering the response for the at least one question at operation 2009.

For example, suppose a user attempts to start-up a connected car. The authentication process is triggered by the start-up attempt detected by the connected car and an access request to the connected car is received by the input receiving unit 202. The question generating unit 204 identifies a type of questions based on at least one of a UI type of the connected car, or an authentication level of the connected car. If a UI type of the connected car is at least one of 'display available' and 'voice available', and an authentication level of the connected car is 'high', the type of questions is identified to be a combination of a user question and a device question. If the UI type of the connected car is 'unavailable', the type of questions is identified to be a device question. The question generating unit 204 generates a user question based on user data of the user. For example, the question generating unit 204 generates a user question, such as "When did you visit Jeju island" by using at least one question key word corresponding to a predefined question template, which is extracted from the user data. The question generating unit 204 generates a device question, such as <start and end time of usage> by using at least one question keyword extracted from device data present in at least one of a device log, historic data, or a device record for a smart car key associated with the user. Herein, the device data can be accessed by triggering an API, and the at least one question keyword can be extracted from the device data by querying at least one of the device log, the historic data, or the device record for the smart car key. Then, the question presenting unit 206 presents the user question to the user, and the device question to the smart car key. The question presenting unit 206 presents the user question to the user through a voice-recognition interface of the connected car. The question presenting unit 206 presents the device question to the smart car key through the API. If appropriate answers for the user question and the device question is received, the authentication unit 208 authenticates the user to access the connected car.

For another example, suppose a user attempts to unlock a door lock of a house. The authentication process is triggered by the unlock attempt detected by the door lock and an access request to the door lock is received by the input receiving unit 202. The question generating unit 204 identifies a type of questions based on at least one of a UI type of the door lock, or an authentication level of the door lock. If a UI type of the door lock is at least one of 'display available' and 'I/O interface available', and the authentication level of the door lock is 'privilege', the type of questions is identified to be a combination of a user question and a device question. The question generating unit 204 generates a user question based on user data of the user. For example, the question generating unit 204 generates a user question, such as "Where did you go last X-mas" by at least one question key word corresponding to a predefined question template, which is extracted from the user data. The question generating unit 204 generates a device question, such as <last sent message size> by using at least one question keyword extracted from device data present in at least one of a device log, historic data, or a device record for a smart gear associated with the user. Herein, the device data can be accessed by triggering an API, and the at least one question keyword can be extracted from the device data by querying at least one of the device log, the historic data, or the device record for the smart gear. Then, the question presenting unit 206 presents the user question to the user, and the device question to the smart gear. The question presenting unit 206 presents the user question to the user through a display of the door lock. The question presenting unit 206 presents the device question to the smart gear through the API. If appropriate answers for the user question and the device question is received, the authentication unit 208 authenticates the user to access the door lock.

For another example, suppose a user attempts to power on a laptop computer. The authentication process is triggered by the power on attempt detected by the laptop computer and an access request to the laptop computer is received by the input receiving unit 202. The question generating unit 204 identifies a type of questions based on at least one of a UI type of the laptop computer, or an authentication level of the laptop computer. If the authentication level of the laptop computer is 'regular', the type of questions is identified to be a device question regardless of the UI type of the laptop computer. The question generating unit 204 generates a device question, such as <application update version> by using at least one question keyword extracted from device data present in at least one of a device log, historic data, or a device record for a smart phone associated with the user. Herein, the device data can be accessed by triggering an API, and the at least one question keyword can be extracted from the device data by querying at least one of the device log, the historic data, or the device record for the smart phone. Then, the question presenting unit 206 presents the device question to the smart phone. The question presenting unit 206 presents the device question to the smart phone through the API. If appropriate answers for the device question is received, the authentication unit 208 authenticates the user to access the laptop computer. If the access request to the laptop computer with 'regular' authentication level occurs within a predetermined period of time after a device with higher authentication level, such as the door lock with 'privilege' authentication level, the type of questions is identified to be a question skipping. In this case, the device question for a smart phone can be skipped and the user can be directly given the access to the laptop computer.

The embodiments disclosed herein can be implemented through at least one software program running on at least one hardware device and performing network management control the elements. The elements shown in FIG. 1 and FIG. 2 can be at least one of a hardware device, or a combination of hardware device and software module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an authentication device for authenticating users in an internet of things (IoT) environment, the method comprising:
    receiving an access request to a first device present in the IoT environment;
    identifying a type of questions based on an authentication level of the first device, wherein the authentication level of the first device corresponds to a required threshold score for accessing the first device;
    generating at least one question corresponding to the type of questions based on at least one of user data of a user associated with the access request or device data of a second device associated with the user;
    presenting the at least one question to at least one of the users or the second device;
    receiving a response for the at least one question from the at least one of the users or the second device; and
    authenticating the user to access the first device based on a determination that a probability score, with respect to the at least one question, generated based on the response is more than or equal to the required threshold score.

2. The method of claim 1, wherein the type of questions comprises at least one of a device question to be presented to a device, a user question to be presented to a user, a combination of the device question and the user question, or a question skipping which denotes an authentication without questioning.

3. The method of claim 2,
    wherein the generating of the at least one question comprises generating the user question, and
    wherein the generating of the user question comprises:
        receiving a predefined question template,
        extracting at least one keyword set from the user data,
        determining at least one question keyword from the user data, and
        generating the user question based on the at least one question keyword.

4. The method of claim 2,
    wherein the generating of the at least one question comprises generating the device question, and
    wherein the generating of the device question comprises:
        triggering application programming interface (API) to access the device data present in at least one of a device log, historic data, or a device record for the second device,
        querying at least one of the device log, the historic data, or the device record for the second device to extract at least one question keyword from the device data, and
        generating the device question based on the at least one question keyword.

5. The method of claim 1,
    wherein the identifying of the type of questions comprises identifying the type of questions based on a user interface (UI) type of the first device, and
    wherein the UI type represents at least one of whether the first device is equipped with a display, whether the first device is equipped with at least one component for a voice recognition, or whether the first device is equipped with an input/output (I/O) interface.

6. The method of claim 1, wherein the presenting of the at least one question comprises presenting the at least one question to the user by at least one of the first device, a user assistant, or an IoT hub.

7. The method of claim 1, wherein the presenting of the at least one question comprises presenting the at least one question to the second device by an application programming interface (API).

8. The method of claim 1, wherein the presenting of the at least one question comprises presenting the at least one question to the user through at least one of a voice or a textual mode.

9. The method of claim 1, wherein the authenticating of the user comprises:
   comparing the response with an actual response using a distance metric to estimate the probability score based on a probability of a user authenticity,
   comparing the probability score with the required threshold score to provide a level of access to the user, and
   providing the level of access to the user based on the probability score.

10. The method of claim 1,
   wherein the type of questions comprises a device question to be presented to the second device,
   wherein the generating of the at least one question comprises generating the device question based on at least one of a device log, historic data, or device record for the second device,
   wherein the presenting of the at least one question comprises presenting the device question to the second device,
   wherein the receiving of the response for the at least one question comprises receiving the response for the device question from the second device, and
   wherein the response for the device question is determined by the second device based on at least one of the device log, the historic data, or the device record for the second device.

11. An authenticating device for authenticating users in an internet of things (IoT) environment, the authenticating device comprising:
   a transceiver configured to receive an access request to a first device present in the IoT environment; and
   at least one processor, operably coupled to the transceiver, configured to control to:
      identify a type of questions based on an authentication level of the first device, wherein the authentication level of the first device corresponds to a required threshold score for accessing the first device, and
      generate at least one question corresponding to the type of questions based on at least one of user data of a user associated with the access request or device data of a second device associated with the user,
   wherein the transceiver is further configured to:
      present the at least one question to at least one of the users or the second device, and
      receive a response for the at least one question from the at least one of the users or the second device, and
   wherein the at least one processor is further configured to authenticate the user to access the first device based on a determination that a probability score, with respect to the at least one question generated based on the response is more than or equal to the required threshold score.

12. The authenticating device of claim 11, wherein the type of questions comprises at least one of a device question to be presented to a device, a user question to be presented to a user, a combination of the device question and the user question, or a question skipping which denotes an authentication without questioning.

13. The authenticating device of claim 12,
   wherein the transceiver is further configured to receive a predefined question template, and
   wherein the at least one processor is further configured to control to:
      extract at least one keyword set from the user data,
      determine at least one question keyword from the user data, and
      generate the user question based on the at least one question keyword.

14. The authenticating device of claim 12, wherein the at least one processor is further configured to control to:
   trigger application programming interface (API) to access the device data present in at least one of a device log, historic data, or a device record for the second device,
   query at least one of the device log, the historic data, or the device record for the second device to extract at least one question keyword from the device data, and
   generate the device question based on the at least one question keyword.

15. The authenticating device of claim 11,
   wherein the at least one processor is further configured to identify the type of questions based on a user interface (UI) type of the first device, and
   wherein the UI type represents at least one of whether the first device is equipped with a display, whether the first device is equipped with at least one component for a voice recognition, or whether the first device is equipped with an input/output (I/O) interface.

16. The authenticating device of claim 11, wherein at least one processor is further configured to control to present the at least one question to the user by at least one of the first device, a user assistant, or an IoT hub.

17. The authenticating device of claim 11, wherein the at least one processor is further configured to control to present the at least one question to the second device by an application programming interface (API).

18. The authenticating device of claim 11, wherein the at least one processor is further configured to control to present the at least one question to the user through at least one of a voice or a textual mode.

19. The authenticating device of claim 11, wherein the at least one processor is further configured to control to:
   compare the response with an actual response using a distance metric to estimate the probability score based on a probability of a user authenticity,
   compare the probability score with the required threshold score to provide a level of access to the user, and
   provide the level of access to the user based on the probability score.

20. The authenticating device of claim 11,
   wherein the type of questions comprises a device question to be presented to the second device,
   wherein the at least one processor is further configured to generate the device question based on at least one of a device log, historic data, or device record for the second device,
   wherein the transceiver is further configured to:
      present the device question to the second device, and
      receive the response for the device question from the second device, and
   wherein the response for the device question is determined by the second device based on at least one of the device log, the historic data, or the device record for the second device.

* * * * *